United States Patent [19]

Given, Jr.

[11] Patent Number: 4,923,708

[45] Date of Patent: May 8, 1990

[54] METHOD AND COMPOSITION FOR INHIBITING FAT BLOOM IN FAT BASED COMPOSITIONS AND HARD BUTTER

[75] Inventor: Peter S. Given, Jr., Verona, N.J.

[73] Assignee: Nabisco Brands, Inc., East Hanover, N.J.

[21] Appl. No.: 292,532

[22] Filed: Dec. 30, 1988

[51] Int. Cl.$^5$ .............................................. A23G 1/00
[52] U.S. Cl. .................................. 426/610; 426/607; 426/631
[58] Field of Search ............... 426/631, 660, 607, 601, 426/306, 610

[56] References Cited

U.S. PATENT DOCUMENTS

| | | |
|---|---|---|
| 1,004,891 | 10/1911 | Moller . |
| 3,667,965 | 6/1972 | Frankenfeld et al. . |
| 4,237,146 | 12/1980 | Kahn et al. . |
| 4,446,165 | 5/1984 | Roberts ............................. 426/604 |
| 4,461,777 | 7/1984 | Maurase et al. . |
| 4,508,746 | 4/1985 | Hamm ................................ 426/612 |
| 4,582,927 | 4/1986 | Fulcher ............................. 426/531 |
| 4,664,927 | 5/1987 | Finkel . |
| 4,726,959 | 2/1988 | Momura et al. . |

FOREIGN PATENT DOCUMENTS

| | | |
|---|---|---|
| 635331 | 1/1962 | Canada . |
| 635336 | 1/1962 | Canada . |
| 823141 | 9/1969 | Canada . |
| 48-4543 | 2/1973 | Japan . |
| 48-04544 | 2/1973 | Japan . |
| 58-198245 | 11/1983 | Japan . |
| 62-058974 | 3/1987 | Japan . |
| 62-210949 | 9/1987 | Japan . |
| 63-56250 | 3/1988 | Japan . |
| 2168071 | 6/1986 | United Kingdom . |

OTHER PUBLICATIONS

Hawley 1981, The Condensed Chemical Dictionary, 10th edition, Van Nostrand Reinhold Co., N.Y., p. 114.
The article by Cerbulus, "The Effects of Various Substances on Blooming of Chocolate", *Journal of Food Technology*, 4, 133–140 (1969).
The article by, "Metabolic Studies of Glyceride Esters of Adipic Acid", *The American Oil Chemists' Society*, vol. 38, No. 2, pp. 84–86 (1961).
Rev. Intern. Chocolate 16, 345–68 (1961).
"Fat Bloom II, Study of the Liquid Fraction", Chocolaterie Confiseric de France No. 322, 18–22 (1976) and Fat Bloom III, Migration of Fat Materials in Composite Products Chocolaterie Confiseric de France No. 328, 3–11 (1976) (FSTA vol. 9 1977).
Journal of Japan Oil Chemists Society 20(6), 322–355 (1971) (cited in FSTA vol. 5, 1973).
1st Internation Congress on Cocoa and Chocolate Research, pp. 257–264 (1974) (cited in FSTA vol. 8, 1976).
Journal of Japan Oil Chemists Society 20(11) 807–810 (1971) cited in FSTA vol. 5, (1973), No. 12.

*Primary Examiner*—Carolyn Paden
*Attorney, Agent, or Firm*—Richard Kornutik

[57] ABSTRACT

A fat bloom inhibitor from an aromatic, alkyl or alkenyl dicarboxylic acid substantially reduces the tendency of white or grey deposits on the surface of chocolate, hard butters, compound coatings and fat based compositions for extended periods of time. The products containing the fat bloom inhibitors further exhibit a prolonged gloss appearance which would otherwise become dull and hazy. The fat bloom inhibitors are intimately mixed throughout the fat composition and are selected from aliphatic and aromatic dicarboxylic acids. The preferred dicarboxylic acids are the lower alkyl or alkenyl dicarboxylic acid such as adipic, sebacic acids, decane and dodecane dicarboxylic acids. Further, suitable dicarboxylic acids may include a hydroxyl or amino group or an ether, ester or amine linkage.

59 Claims, 11 Drawing Sheets

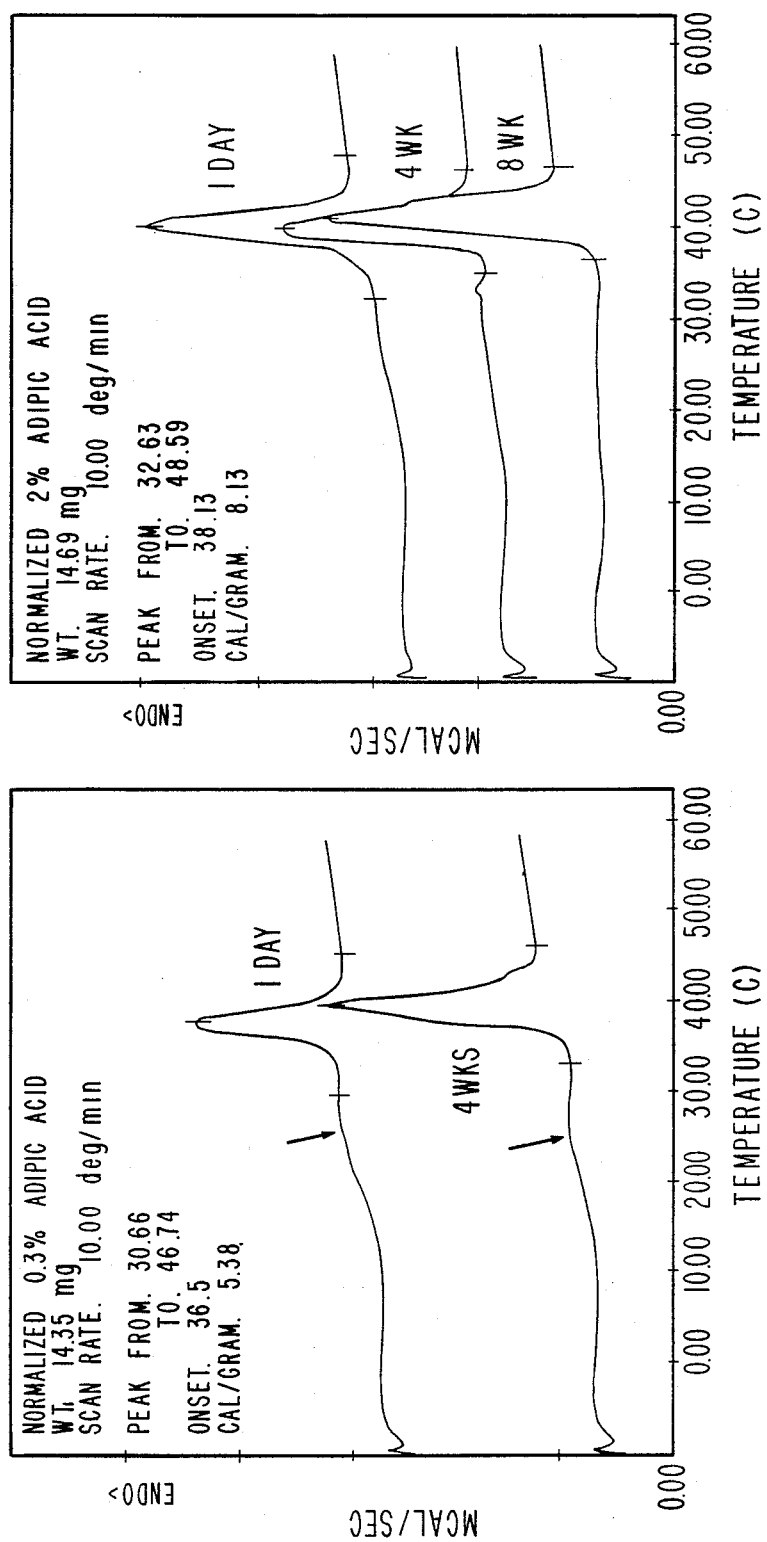

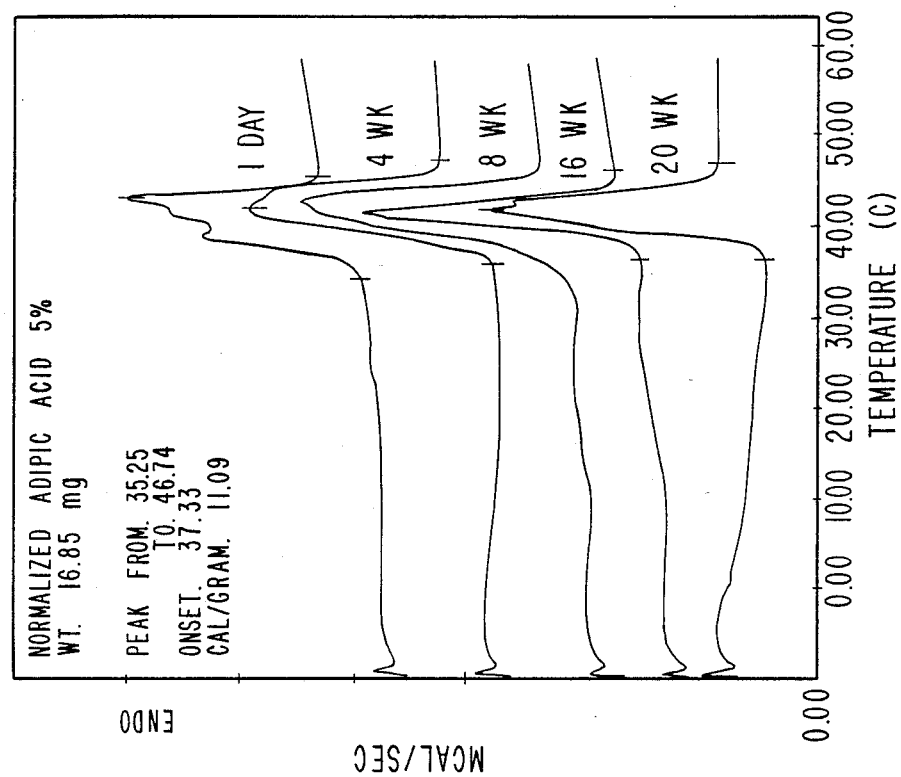

METHOD AND COMPOSITION FOR INHIBITING FAT BLOOM IN FAT BASED COMPOSITIONS AND HARD BUTTER

BACKGROUND OF THE INVENTION

1. Field of the Invention

The present invention is directed to fat compositions, hard butters, hard butter confectioner's compositions, and highly flavored fat containing compound coatings having an improved gloss retention and an increased resistance to fat migration and fat blooming. More particularly, the invention relates to a fat blooming inhibitor for inedible and edible fat compositions such as chocolate and flavored hard butter compound coatings which can be added directly to the composition during processing. The hard butter compound coatings, confectioner's composition and other fat compositions prepared according to the invention are particularly resistant to fat blooming and able to retain their gloss particularly when coated over high fat centers.

2. Description of the Prior Art

The food and chocolate industry has consistently been contending with the phenomena known as fat bloom or chocolate bloom. Fat bloom is generally associated with the migration of fats toward the surface and the appearance of a white or light grey colored deposit on the surface. Prior to the time the white deposit is visible the product usually becomes dull and hazy having lost the high gloss surface. Although taste and texture of the overall product may not be seriously altered by the early stages of fat bloom the dull appearance and white deposit make it look old, stale and unappetizing to the consumer. Fat bloom, as a consequence, results in a loss of sales and increased handling and production costs to the manufacturer.

The problem of fat bloom of hard butter compound coatings and chocolate is extremely complex and believed to be caused by a number of independent factors often times with no correlation between them. The actual cause of fat bloom is not fully understood although several theories have been proposed. The principal of fat bloom is generally understood to be the migration of fats to the surface where they recrystallize. The fat crystals grow in size over time to first produce a dull appearance to what was once a glossy surface. As the crystals grow still larger the light colored deposit appears. It is this light colored deposit which is commonly referred to as fat bloom. Factors which are known to promote the occurrence of fat bloom include prolonged storage at high temperatures followed by cool temperatures and cyclic temperature changes over a period of time such as may occur during shipping and handling.

Chocolate, chocolate coatings and chocolate flavored hard butter coatings are particularly prone to fat bloom. Chocolate is an intimate mixture of cocoa butter, sugar, cocoa particles and lecithin. Optional ingredients such as milk solids, vanilla flavoring and nuts may also be added. The cocoa butter in chocolate is known to be present in at least three polymorphic forms and it is the polymorphic behavior of cocoa butter which is believed to be a contributing cause of fat bloom in chocolates. The presence and ratio of the different polymorphic forms is, at least in part, dependent on the processing conditions and tempering of the chocolate. The different crystal forms of the cocoa butter are most readily identifiable by their melting points and x-ray diffraction pattern corresponding to the different molecular orientations.

Solid fats as a class tend to exhibit polymorphism. Polymorphism is generally described as the ability of the solid to exist in several different crystalline forms depending on the manner in which the molecules orient themselves in the solid state. The different crystal forms have a marked effect on the melting point of the fat.

The crystalline forms of cocoa butter have different energy potentials such that those with the higher energy potential (free energy) are less stable and tend to transform to the configuration of the low energy form. The stability is generally attributed to the chair configuration about the triglyceride linkage and the ability of the molecules to stack on each other in a lattice-like fashion resulting in tighter packing. The stable form has the highest melting point of the different crystal forms and is the preferred form in manufacturing most products.

When the comparatively unstable crystalline forms transform to the stable form, considerable amounts of energy are released as heat causing a temporary increase in the amount of liquid phase in the chocolate. It is believed the liquid phase tends to dissolve the higher melting crystal fractions which then migrate and recrystallize resulting in fat bloom. It is therefore desirable to have the fat present in the stable crystal form or at least increase the ratio of the stable form in the fat mixture. The desirability of the more stable form is also due to its resistance to migrate compared to the other crystal forms. One proposed theory for the resistance to migration is the tighter packing of the lattice structure formed by the chair configuration of the crystals. The lattice is formed by adjacent crystals stacking on each other in an inverted position. The lattice has been proposed to form a network of crystal lamella functioning as a barrier /to inhibit the migration and recrystallization of the fat.

The presence of the crystalline forms and their instability are evident by a comparison of the Differential Scanning Calorimetry (DSC) melt profiles over a period of time. DSC essentially records and charts the melting points or melting range of the various components of a composition. The height of individual peaks are generally in proportion to the approximate ratios of the amount of components present. The cocoa butter in chocolate, for example, can reveal three or more peaks corresponding to the different crystal structures. A series of DSC profiles carried out over a period of weeks and months show a gradual merging of the peaks toward a single peak corresponding to the most stable form. This reduction in the height of some of the peaks demonstrates the conversion of the relatively unstable crystal form into the more stable form.

A cocoa butter composition, such as chocolate, having a substantial portion of the fat in the stable form has shown a lesser tendency to fat bloom and a longer gloss retention of the surface over an extended period of time compared to some confectioner's compositions or hard butters. The industry has therefore sought to increase the concentration of the stable forms and to stabilize the fats in the composition by the use of various chemical additives as well as chemical modification of the various components to immobilize the fat crystals.

In the manufacture of chocolate and confectioner's compositions careful control of the processing steps are known to effect the loss of gloss and the rate and extent of fat bloom. This is particularly true in the chocolate enrobing of fat based centers. For example, as described in "Studies On The Formation Of Fat Bloom And Methods Of Delaying It" *Rev. Intern. Choc.* 16, pg 345–68 (1961) controlling the temperature of a fat based center is essential to achieve a stable chocolate coating having a high gloss retention and good texture. Under some conditions the fat from the coated center may tend to migrate into the coating thereby changing the composition of the coating. The coating of cold centers with the melted chocolate tend to develop a multitude of fine hairline cracks and prevent proper crystal growth. These cracks are generally due to the sudden setting of the coating over the cold center but have also been attributed to a rapid external cooling followed by syneresis. These hairline cracks are believed to promote fat bloom in the coating and in particular those with a high fat center.

To avoid the formation of these cracks the practice is to pre-warm the centers thoroughly before coating and to gently cool the coated product over a period of time. Radiant cooling of the chocolate coating in essentially motionless air largely prevents cracks and the tensions associated with rapid cooling. Since time constraints in the commercial setting do not always permit radiant cooling the coated products may pass through a cooling tunnel where the rate of cooling is controlled at about 6° C. per minute.

In addition to proper cooling of the chocolate, fat bloom is dependent on the proper tempering of the chocolate. Tempering is generally the controlled heating to melt fat crystals and cooling under controlled conditions to a predetermined temperature to obtain small fat crystals in as stable form as possible. Chocolate should have a high gloss and a hard clean break. The high gloss and texture is achieved only by the presence of minute stable fat crystals evenly dispersed throughout the fat system. Fat bloom can be appreciably retarded when there is a complete dispersion of the non-fat components in the fat to form a continuous uninterrupted layer of fat.

Hard butter and confectioner's coatings containing hard butter differ from the relatively predictable nature of cocoa butter since hard butters are usually made up of a very large number of different triglycerides and fatty acids. Hard butters may be made from several vegetable fats and contain as many as 10–80 different components. These different components tend to behave as if made up of a single component and when solidified and crystallized exhibit a single, although sometimes broad, melting point range. Some of these compositions, on the other hand, tend to exhibit self-fractionation. Self-fractionation occurs when some of the components form distinct crystals separate from the composition and act as different components which have a different melting point range from the rest of the composition. This complex nature of the fractionation of hard butter compositions is more likely the cause of the fat bloom rather than polymorphism as is speculated for cocoa butter. In direct contrast the characteristics of hard butter and confectioner's compositions, chocolate and cocoa butter are almost entirely due to the polymorphic behavior of the triglycerides. In view of these differences between hard butter and cocoa butter, a component which has been effective in retarding fat bloom in cocoa butter may not necessarily be effective in controlling bloom in hard butter compositions.

Numerous attempts have been made in the past to inhibit fat bloom by chemical modification of the cocoa butter glycerides by selective hardening and trans-esterification or by the inclusion of various chemical additives. These efforts have demonstrated only limited success in inhibiting fat bloom while exhibiting a number of adverse side effects and increased production costs.

Some of the chemical additives which have been somewhat effective in inhibiting fat bloom in chocolate are not commercially feasible due to the alteration of the flavor and texture. A satisfactory bloom inhibitor must prolong the shelf life of the product by retaining the gloss without changing the taste, sweetness or texture. Similarly, the inhibitor should have no aftertaste and should not alter the melting point of the chocolate.

One such effort is disclosed in U.S. Pat. No. 4,664,927 relating to the immobilizing of the normally flowable fats at temperatures above their normal melting point. The procedure provides for the addition of a polyol such as glycerine to increase the viscosity of the system by reacting with the fat in the liquid phase. The increase in viscosity is intended to prevent the chocolate product from melting at low temperatures and from adhering to the wrapper. The process does not address the problem of fat bloom. In addition, the gloss retention is not enhanced by the addition of the polyols containing at least one pair of vicinal hydroxyl groups.

One type of fat bloom inhibitor is described in U.K. Patent Application No. 2,108,071A which employs a triglyceride composition having a 30–100% by weight $C_{50}$–$C_{52}$ fatty acid content and an iodine value of 0.5. The preferred glycerides include the fully hydrogenated oils of palm, cottonseed, rice, corn, illipe butter, cocoa butter, phulwara butter and fractionated milk fat. These compounds are stated to be effective in inhibiting fat bloom without resulting in a waxy or firm texture that has been characteristic in the use of highly saturated fats. There is no suggestion of the use of non-glyceride additives such as the polyols or carboxylic acids.

Japanese Patent Nos. 7304543-R and 7304544-R describe a similar type of additive to enhance anti-blooming properties of chocolate. The described inhibitor comprises a hardened butter from hydrogenated castor oil and a hardened lard fraction. The resulting hardened butter is then added to a prepared chocolate and processed under conventional procedures.

Still another use of triglyceride to attempt to inhibit fat bloom is described in Momura U.S. Pat. No. 4,726,959. In this composition the bloom inhibitor comprises a mixture of triglycerides of both saturated and unsaturated fatty acids. Canadian Patent No. 823,141 seeks to control fat bloom by the addition of interesterified triglycerides.

As reported in Kleinert, "Formation Of Fat Bloom and Methods Of Delaying It" *Rev. Intern. Chocolate.* Vol. 16, 345–68 (1961) a few of the glycerides which have shown some fat bloom inhibiting effects include Biscuitine fat, hardened arachis fat and butter fat. The results from this study indicate that to achieve the fat bloom inhibiting effects the processing conditions such as cooling and tempering must be carefully controlled.

The previously employed glyceride compositions and methods of inhibiting fat bloom in chocolate have experienced only limited success due to the undesirable changes in the texture, mouth feel, melting point and taste of the final product.

Extensive research has been conducted to develop effective bloom inhibiting additives which can be combined directly with the triglyceride composition. A few of these additives which have shown some bloom inhibiting characteristics have been reported in Cerbulus, "The Effects of Various Substances On The Blooming Of Chocolate", *Journal of Food Technology* Vol. 4, 133-140 (1969). For example, chocolate containing additional quantities of the triglyceride tripalmitin is reported to have no tendency to bloom and no adverse flavor changes. On the other hand the additives Deft 37 (trademark) and Edelfette (TDM) (trademark) improved the bloom resistance of samples tested but were unacceptable due to the waxy taste.

Examples of other additives which have been ineffective in controlling or retarding bloom in cocoa butter include hydrogenated butter fat, butylated hydroxy anisole (BHA), glycerol and various amino acids. Moreover, the hydrogenated butter fat produced an unpleasant taste while BHA resulted in an unsightly white appearance with a granular texture.

Anhydrous glucose has been shown to produce a high resistance against fat bloom in proportions amounting to 15-20% by weight of the chocolate. Glucose, however, resulted in a distinct aftertaste in the throat after eating.

Other compounds that have been suggested for possible fat bloom prevention with only limited success include amino acids such as alpha amino N-butyric acid, glycine, cysteine and glutamic acids, bile acids, cetyl alcohol, cholesterol, choline-HCL, citric acid monoglyceride, lactose, low HLB sucrose polyesters, maltrins, methionine, polymerized cocoa butter, phytic acid, polyglycerol fatty esters, polyoxyethylene sorbitan monostearate, propylene glycol fatty acid esters, sorbitan monolaurate, and monostearate, and taurine. Although many different types of compounds have been suggested for use as fat bloom inhibitors they have generally proved to be unacceptable in commercial practices.

There is accordingly a need for an effective additive which will enable a hard butter, confectioner's composition and chocolate to retain its gloss, prolong shelf life and inhibit the formation of the white crystalline fat deposits on the surface without having an adverse impact on the nutrition of the finished food product. There is further a need for a fat bloom inhibiting composition which does not exhibit the undesirable health risks associated with some food additives.

The present invention is therefore directed to an effective bloom inhibiting additive which prolongs the gloss of hard butter, chocolate, and other hard butter based systems such as confectioner's coatings and prevents the formation of crystals on the surface of the product referred to as fat bloom. The additives according to the invention do not adversely effect the sweetness, nutritional value, taste or texture of the finished product.

The fat bloom inhibitor according to the invention includes the aliphatic and aromatic dicarboxylic acids in a particulate form. The dicarboxylic acids are of a particle size such that they can be dispersed uniformly throughout the fat composition. One of the preferred forms of the invention employs adipic acid as the fat bloom inhibitor. Adipic acid is food use accepted, relatively inexpensive and readily available. Adipic acid is commonly employed in the prior art edible compositions for other uses such as food preservatives as described in Japanese Patent No. 2,085,974 and as an acidulant to provide tartness, as used in Kahn, U.S. Pat. No. 4,237,146, Canadian Patent No. 635,331 and Canadian Patent No. 635,336. None of the prior art compositions suggest the use of adipic acid or other dicarboxylic acids as a fat bloom inhibitor. The prior art examples which have examined the carboxylic acids and the dicarboxylic amino acids such as glutamic acid reported them to be ineffective in preventing or retarding fat bloom and prolonging the gloss of the chocolate.

Glyceride esters of adipic acid have also been used as viscosity enhancers resistant to oxidation in food substances as described in Shull, "Metabolic Studies of Glyceride Esters of Adipic Acid" *The American Oil Chemists' Society*, Vol 38, No. 2 pp 84-86 (1961).

Other known chemical additives commonly employed in the foods include the diols as anti-staling agents in bread products to increase shelf life as in Frankenfeld, U.S. Pat. No. 3,667,965 and amino acids to increase the shelf life of oil-in-water emulsions as in Murase, U.S. Pat. No. 4,461,777.

SUMMARY OF THE INVENTION

The disadvantages and limitations of the previously employed fat bloom inhibitors and methods of processing to control fat bloom are obviated while providing an effective additive for prolonging gloss and inhibiting fat bloom in edible and non-edible triglyceride containing compositions. The additives according to the invention when utilized in edible triglycerides such as chocolate, hard butters and confectioner's compositions do not alter the taste, melting point or viscosity of the resulting product. More particularly, the invention relates to chocolate and chocolate flavored fat containing compositions suitable for use in coating over cookies and other edible centers without incidence of fat bloom or a loss of the glossy surface.

The novel fat bloom inhibiting additives are preferably alpha, omega linear dicarboxylic acids having 4 to 22 carbon atoms in the chain. The backbone of the diacid in the preferred form is an aromatic moiety or a straight alkyl chain having 4 to 22 carbon atoms. The alkyl chain may alternatively be branched and contain one or more points of unsaturation, an amine, carboxyl or ether linkage. One or more of the carbons in the chain may have an amino, hydroxyl or lower alkyl ester substituent.

The preferred acids are the lower alkyl dicarboxylic acids and in particular adipic acid. The adipic acid is reduced to a fine granular form and added directly to the fat containing composition during the melting and mixing step in the preparation of a finished compound coating. The particle size of the acid may be between 5 to 200 microns and may be a mixture of different size particles. Particles ranging in size of 10 to 30 microns have been found to be particularly beneficial in prolonging the gloss and retarding the formation of fat bloom without adversely affecting the taste of the product.

The amount of acid added to the fat containing composition will vary depending on the acid utilized, the fat system and its tendency to fat bloom and to loose its gloss, and the target shelf life. The amounts of acid found effective in inhibiting bloom formation without altering the other characteristics of the fat composition are from 0.01 to 5.0 percent by weight of fat present depending on the type of acid and particle size. The preferred range is between 0.1 and 0.5 percent by weight of fat at about 20 micron particle size.

The novel bloom inhibitors have been found useful in prolonging the gloss of chocolate, chocolate coated centers, and chocolate flavored confectioner's and compound coatings generally employed to coat candy, cookies, baked or fried breads, rolls, pastries, snack foods, breakfast cereals and other edible products such as dried fruits or a fruit paste. By incorporating the dicarboxylic acids according to the invention in the fat compositions the incidence of bloom is reduced and the products display a longer shelf life without loosing the initial gloss.

BRIEF DESCRIPTION OF THE DRAWINGS

The invention is to be understood in conjunction with the figures of which the following is a brief description.

FIG. 17 is a melt profile of a finished unfractionated hard butter coating composition 0.3% adipic acid on Day 1 and Week 4.

FIG. 18 is a melt profile of a finished unfractionated hard butter coating composition containing 2.0% adipic acid on Day 1, Week 4 and Week 8.

FIG. 19 is a melt profile of a finished unfractionated hard butter coating composition containing 5.0% adipic acid on Day 1, Week 4, Week 8, Week 16 and Week 20.

DETAILED DESCRIPTION OF THE INVENTION

Figure 2:
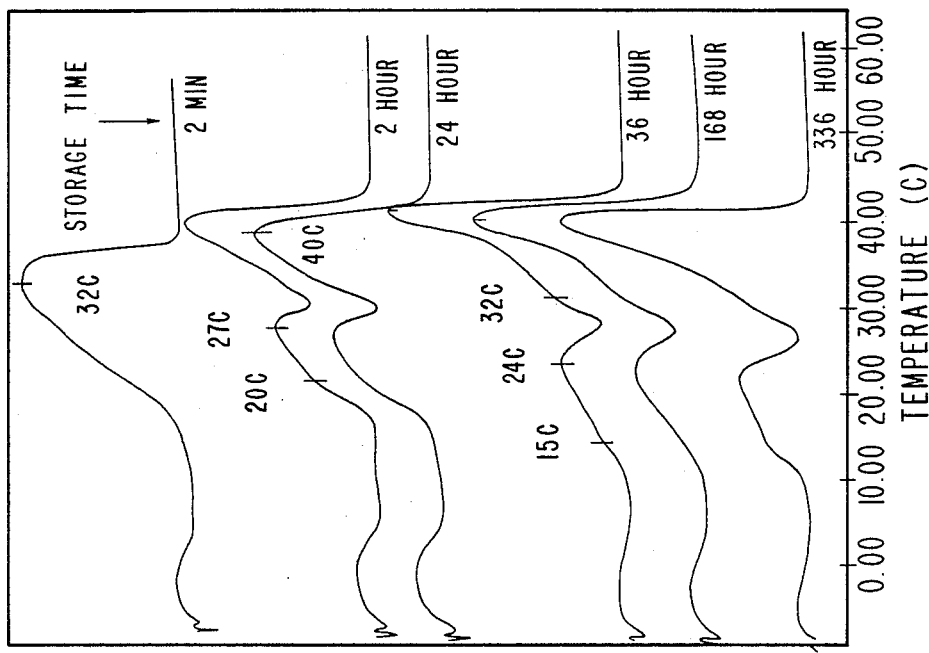
FIG. 2 is a series of melt profiles of an unfractionated palm kernel oil hard butter.

The present invention is directed to a novel fat bloom inhibitor particularly useful in controlling and retarding the migration of fats and the growth of fat crystals on the surface of a fat containing composition. The inhibitor in accordance with the invention has been shown to be effective in prolonging the high gloss surface and preventing the dull haze which often develops during storage of fat compositions. The novel fat bloom inhibitors are particularly useful in controlling bloom in inedible fat compositions as well as the edible compositions such as chocolate, compound coatings and confectioner's compositions.

During prolonged storage of fat systems and in particular confectioner's compositions made from hard butters, a white or grey deposit tends to form on the surface of the product known as fat bloom. In the present invention fat bloom is intended to refer to the migration of the triglycerides to the surface of the product which is characterized by the loss of glossy appearance and eventually the formation of the white haze. Although fat bloom is simply the formation of fat crystals from the composition, its appearance is generally considered unpleasant to the consumer. The ability to prevent or retard fat bloom will provide an extended shelf life and a more pleasing appearance to the product thereby resulting in reduced losses to the manufacturer.

Since the mechanism by which fat bloom occurs is not completely understood efforts to control fat bloom have not been completely successful. It is generally understood that in cocoa butter and some fat compositions fat bloom is due in part to the polymorphic behavior of the fat crystals and the tendency of the unstable crystal forms to transform to the more stable form. During the transformation to the most stable form the unstable fat crystals release energy as heat and tend to liquify and dissolve the higher melting crystals which then migrate and recrystallize to form fat bloom. As the crystals on the surface continue to grow and become larger the surface gloss disappears and the white powder deposit builds up. During the production of tempered chocolates and tempered hard butter it is desirable to have the fats present in the most stable form as this has been shown to reduce the tendency of fat bloom.

In the preferred embodiment of the invention the fat composition is chocolate or confectioner's compositions as are well know in the art. It is to be recognized that although the preferred embodiment utilizes the edible fats and particularly the triglycerides, the invention is further directed to prolonging the gloss and preventing fat bloom in inedible triglyceride containing compositions such as polishes, candles and the like. Confectioner's compositions of the invention are generally comprised of 20–50% hydrogenated, fractionated or interesterified fats or shortening, and 50–80% by weight suspended solids of sugar and a flavoring agent such as cocoa powder, lecithin, milk solids and vanilla. The chocolate and confectioner's compositions employed in the invention are particularly suitable for enrobing cookies fruits and high fat based compositions. The fats, according to the preferred embodiment of the inventions, are those typically employed in such confectioner's compositions including the vegetable fats such as palm oil, cocoa butter, palm kernel oil, soybean oil, corn oil, illipe oil, phulwara oil, coconut oil, peanut oil, cottonseed oil, rapeseed oil and the like which have a low melting point and exhibit a tendency to flow at temperatures slightly above room temperature. A typical fat used in the industry in a compound coating is derived from palm kernel oil. Palm kernel oil is primarily made up of triglycerides of lauric, palmitic, stearic, oleic, and myristic acids. The actual percentage of each triglyceride will vary depending on the source and industrial modification including refining, hydrogenation and interesterification.

The fat bloom inhibiting composition is primarily intended for use in chocolate and the flavored confectioners or compound coatings which are routinely used in confectionery products. As used hereinafter the terms confectioner's coating or composition and compound coatings are intended to include conventional triglyceride-based coating compositions used in making candy and other confectionery products. Such compositions normally include large amounts of a hard butter such as a fractionated, hydrogenated and interesterified palm kernel oil and which includes sugar, milk solids, lecithin and a flavoring agent such as cocoa powder. Compound coatings and confectioner's coatings are generally distinguished in the industry from chocolate which, by government standards, are required to be a cocoa butter base. One common type of confectioner's hard butter composition contains a suitable amount of a mixture of chocolate liquor and cocoa powder. These compositions are usually referred to as fudge, chocolate flavored, and imitation chocolate coatings since they generally do not contain cocoa butter. The examples discussed in detail below exemplify the primary use of such confectioner's composition as a fudge type coating composition used to enrobe cookies, breads, pastries, crackers, snack foods, cakes, candies, fruit pastes, dried fruits and the like. Fudge coated raisins, cookies, graham crackers and cakes are presently being produced by a number of manufacturers and sold commercially under various trade names.

Chocolate flavored compound coatings in the past have exhibited a tendency to bloom and a loss of gloss when used to enrobe confectioneries, fruits, nuts, cookies and cakes, due in part to the relatively high fat content of the base. By incorporating one or more of the novel bloom inhibitors, as discussed hereafter in greater detail, the coated confectionery products display improved resistance to bloom and a retention of the high gloss surface. Accordingly, the present invention is further directed to a confectioner's composition coated cookie or cake having an improved resistance to fat bloom. In particular the invention is concerned with chocolate flavor or fudge coated cookies since the fat bloom is more readily noticed on a dark fudge coating.

The fat bloom inhibitors in accordance with the invention include the aromatic and aliphatic dicarboxylic acids. In the preferred form of the invention the dicarboxylic acid is identified by the formula:

HO$_2$C—R—CO$_2$H wherein R is a branched or straight chain alkyl or alkenyl having 4 to 22 carbon atoms or an aromatic moiety. The alkenyl group may have more than one point of unsaturation. R may further be (CH$_2$)$_x$—R$_1$—(CH$_2$)$_y$ wherein R$_1$ is an ether, aryl, amide, carbonyl, amine or carboxyl ester group and x and y are 0 or an integer from 1-22 provided that the sum (x+y) is an integer from 4 to 22.

The alkyl and alkenyl dicarboxylic acids which are particularly suitable to practice the invention include adipic acid (hexanedioic acid), sebacic acid (1,8 octanedicarboxylic acid), pimelic acid (1,5 pentanedicarboxylic acid), cis-3-hexenedicarboxylic acid, trans-3-hexenedicarboxylic acid, malonic acid, decanedioic acid and dodecanedioic acid. Other compounds include 4-aza-5-keto-1,10-decanedioic acid, HOOC—(CH$_2$)$_2$-NHCO—(CH$_2$)$_4$—COOH; 5-oxo-1,9-nonanedioic acid, HOOC-(CH$_2$)$_3$—O—(CH$_2$)$_3$—COOH; 4-keto-1,7-heptanedioic acid, HOOC—(CH$_2$)$_2$—CO—(CH$_2$)$_2$—COOH; 4-octene-1,8-dioic acid, HOOC—(CH$_2$)$_2$—CH=CH—(CH$_2$)$_2$—COOH; and p-pentanoic pentanoic benzoic acid, HOOC—(CH$_2$)$_4$

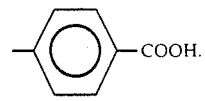—COOH.

The amount of the novel fat bloom inhibitor utilized in the fat system will vary depending on the types of fat contained in the composition and the particular dicarboxylic acid employed. Other factors which will effect the amount of acid used include the particle size of the dicarboxylic acid, the expected shelf life and the inherent tendency of the particular composition to bloom. The amount of the dicarboxylic acid found to be effective in preventing bloom in confectioner's compositions is in the range of about 0.1 to 5.0 percent by weight of fat. The preferred range is generally between 0.1 percent and 2.0 percent by weight.

The optimum amount of the dicarboxylic acid which can be added to edible fat systems is further limited by the effects of taste and changes in texture of the resulting product. Since acids tend to impart a sour flavor to food products, caution must be exercised to ensure the flavor is not adversely affected. In addition, the carboxylic acids are generally insoluble in a fat system and thus remain in their crystalline form and as such may result in a grainy texture to the product if the particle size is too large.

In the preferred embodiment of the invention adipic acid is used since it is relatively inexpensive, readily available and often used in the food industry. Adipic acid having a average particle size of about 150 microns when added to a hard butter composition in the amount of 5.0 percent by weight of fat has shown to be effective in controlling fat bloom, as described hereafter in greater detail. At this concentration, however, the bitterness of adipic acid carries through to the final product to impart an undesirable tart flavor. In addition, particle sizes in the range of 150 microns tend to adversely effect the texture and mouth feel of the confectioner's composition. The preferred range of adipic acid in a confectioner's composition is generally between 0.1 and 2.0 percent by weight. Adipic acid, when present at about 0.25% by weight, has been found particularly effective. At this concentration the flavor of the confectioner's composition is not adversely effected and still demonstrates a resistance to fat bloom.

The ability of the dicarboxylic acid to prolong the gloss and prevent fat bloom has been shown to be directly related to the particle size of the dicarboxylic acid. As the particle size is reduced the surface area is increased thereby increasing the active nuclei and increasing the fat bloom inhibiting affects. Since the surface area of the particles is also related to the tendency to impart the sour flavor to the product a balance must be maintained between the bloom inhibiting effects and the adverse flavor characteristics of the dicarboxylic acid. The particle size of the dicarboxylic acid, according to the invention, may range between 5 and 200μ. The commercially obtained dicarboxylic acids which have shown to be effective fat bloom inhibitors have a substantial portion of the particles in the range of 50 to 150μ. The preferred particle size of the dicarboxylic acid is in the range of 10 to 30μ.

In the preferred form of the invention the dicarboxylic acid is milled to a particle size of approximately 20 microns which corresponds essentially to the size of the solids which include sugar, cocoa powder and milk solids in the confectioner's composition. The acid is then mixed with the hard butter composition in an amount of approximately 0.1 percent to 2.0 percent by weight. This generally produces an edible composition which exhibits a prolonged gloss and a reduced tendency to fat bloom without adversely affecting the flavor and texture of the composition. In terms of overall effectiveness the particle size of the acid should be as small as possible to achieve the maximum bloom inhibiting effects. With the small particle sizes the amount of acid employed is generally limited only by the undesirable effects on the taste and texture of the product.

The hard butter and confectioner's composition may be obtained commercially or prepared according to standard procedures as are well known in the art. The confectioner's composition is initially heated for a sufficient time to melt all of the fat crystals and to erase all crystal memory. To the melted composition the dicarboxylic acid is slowly added with continued mixing for a period of time, generally in the range of 1 to 120 minutes, followed by tempering by cooling the melt to about 28°-32° C. until a thickened consistency is obtained. The composition is then carefully heated to about 34°-36° C. after which it can be transferred to a suitable mold or applied as a coating. It is, of course, essential the dicarboxylic acid be uniformly dispersed throughout the composition.

Since the actual mechanism and causes of fat migration and fat bloom are not fully understood there is some uncertainty in the mechanism by which the dicarboxylic acids inhibit fat bloom formation. Under normal circumstances a confectioner's composition or a compound coating may contain several crystal forms dispersed throughout the matrix. Over an extended period of time the less stable crystal forms tend to undergo a monomorphic transformation to the more stable crystal form which is usually accompanied by the formation of fat bloom. The absence of the less stable crystal forms during the processing steps has been shown to produce a composition which is less prone to fat bloom. Proper tempering procedures are known to delay the onset of fat bloom but do not completely prevent it.

One proposed mechanism for the effectiveness of the dicarboxylic acids is the interaction of the dicarboxylic acid with the stable form of the fat crystals. The dicarboxylic acids which have been shown to be particularly effective are the acids whose chain length is similar to the chain length of the fatty acid of the triglycerides in the fat system. The dicarboxylic acids having a chain length of less than four carbons have generally shown minimal bloom inhibiting effects to confectioner's compositions or cocoa butter which contain large amounts of triglycerides of fatty acids having 16-18 carbons.

It is well documented the most stable form of the triglycerides in hard butter is the crystal structure which has a chair configuration formed about the triglyceride linkage. In the chair configuration the triglycerides tend to stack one upon another to form a lattice type structure. One proposed theory for the effectiveness of the dicarboxylic acids is that the highly polar carboxyl groups on the dicarboxylic acid tend to form a polar bond with the polar regions of the triglyceride pulling the molecules toward each other, thereby strengthening the lattice structure and the lamellar layers. This increase in strength of the lattice structure tends to favor the transformation of the triglycerides from the unstable crystalline forms to the more stable form. The strength of the lattice structure increases as the overall mobility of the lower melting crystal fractions which may liquefy and the fat system is decreased. This reduced mobility thus inhibits the migration of triglycerides and the formation of fat crystals on the surface thereby inhibiting or delaying the formation of fat bloom and prolonging the high gloss surface. This theory is consistent with the test data which shows a lesser tendency of the short chain dicarboxylic acids to reduce or inhibit fat bloom of the longer chain fatty acids (16-18 carbons). The shorter chain diacids may not be able to span the distance between the polar regions of the triglyceride and thus not strengthen the lamellar layers as do the longer chain dicarboxylic acid.

An alternative proposed mechanism for the fat bloom inhibiting effects of the dicarboxylic acids is the ability of the acid groups to form hydrogen bonds with polar regions of the proteins present in the composition and the sugars. The hydrogen bonding between the proteins and the sugars are believed to form an additional lattice structure which is able to further immobilize the fat system and thus prevent fat recrystallization on the surface of the finished product.

In order to measure the occurrence of fat migration and fat crystal growth on the surface of the composition a number of analytical methods have been employed for comparative purposes. It is known the gloss of the composition is directly related to the size of the particles on the surface. As the fat migrates toward the surface the fat crystals continue to grow. Once they reach a critical size the surface of the composition becomes dull and the amount of specular reflected light is decreased. As the crystals continue to grow in size, the color of the composition lightens until a white or grey haze appears. One method that has been employed to measure the fat bloom therefore seeks to measure the amount of light that can be reflected from the surface of the composition over a period of time, thereby giving an indication of the change in fat migration and crystal growth.

A reflectometer is used to measure the amount of light reflected from the surface of the sample. The percentage of reflected light is then plotted against the wave length to produce a reflectance curve for selected colors. The color of the hard butter composition may also be represented in terms of tristimulus values for the red, blue and green spectral colors; of green, amber and blue reflectance; and of a measure of the diffused reflectance. With these scales it is possible to represent the color by its position in a three coordinate system. By comparing graphs of different samples the change in color and the degree of fat bloom can be determined.

Another method for measuring fat crystal migration and the reduction of gloss of the hard butter composition, although less preferred, is to visually examine the surface of a sample and apply a subjective evaluation based on a comparison with a control sample. This method is, of course, less reliable due to the subjective nature of the procedure and does not always provide consistent results.

The preferred method of measuring fat bloom employs Differential Scanning Calorimetry (DSC). Unlike the other methods employed, DSC does not directly measure the visible changes in gloss on the surface but rather determines the ratio of crystalline components in the composition giving an indication of the likelihood of bloom occurring. Essentially, DSC measures and records the heat of fusion of the different crystal forms in the sample and provides a melting profile corresponding to the different crystal structures present. Since the presence of the more stable form of the fat crystals is known to decrease the probability of fat bloom the DSC melt profile gives an accurate indication of the probability of the sample developing fat bloom.

As previously discussed the triglyceride crystals of cocoa butter are found in at least three distinct crystal forms. The less stable crystal forms have a lower melting point than the more stable form and tend to liquify at lower temperatures during shipping and handling. This constant liquefying and recrystallization has been proposed as one possible explanation for the migration of the fat and crystal growth, the loss of gloss on the surface and the formation of fat bloom. The higher percentage of the more stable form which is present is known to reduce the occurrence of fat bloom.

Differential Scanning Calorimetry measures the quantity of energy absorbed during melting of the composition which is then plotted against the temperature to give a thermogram indicative of the melting points of the various components in the composition. A thermogram of a standard tempered cocoa butter composition may typically show at least three distinct peaks representing the multiple crystal forms which are distinguishable by their different melting points. As a general rule, the relative heights of the peaks correspond to the amount of each crystal form present.

A series of DSC thermograms when made from a standard cocoa butter composition over an extended period of time reveals a very slow change in compositions, as reflected in the small change in the thermogram. Over time some of the peaks will diminish in height while one peak will gradually increase in height. The change in the peaks are the result of the transformation of the unstable crystal forms into the more stable form. As the unstable crystal form is transformed the peak corresponding to the unstable form diminishes in height while the peak corresponding to the stable form increases in height. During the time normally required for transformation from the unstable form to the stable form the cocoa butter composition normally experiences severe fat bloom. As long as the unstable crystal forms are present in the glyceride composition the inherent tendency of fat migration and fat bloom to occur is present.

The following examples demonstrate the above-noted characteristics of cocoa butter, hard butter and confectioner's compositions and the effects of the dicarboxylic acids on the prevention of bloom and prolonging the gloss. Although the specific examples are based on edible compositions containing a hard butter and include edible dicarboxylic acids as the bloom inhibitors these examples are not intended to be limiting. It is known that most fat based compositions and coatings have a tendency to loose their gloss over time and exhibit some fat bloom. The bloom inhibitors of the present invention are suitable in all fat based compositions for prolonging the gloss and inhibiting fat bloom.

In the following examples comparative data are presented to demonstrate the characteristics of hard butter and confectioner's coating compositions and the effects of the novel fat bloom inhibitors. When used herein the stabilizing effect of the inhibitor is intended to refer to the interaction of the dicarboxylic acids with the triglycerides which reduce the tendency of the triglycerides to self-fractionate. As demonstrated below, the dicarboxylic acids have the ability to interact with the triglycerides and stabilize them in a manner such that they behave and produce melt profiles as if they were made up of a single component, rather than the large number of triglycerides which usually make up a hard butter or compound coating.

EXAMPLE 1

A commercially available hard butter was stabilized and examined as a starting point to demonstrate the characteristics of a hard butter after stabilizing under controlled conditions. The hard butter examined was a commercially obtained partially hydrogenated and fractionated palm the kernel oil (PKO). The stabilized hard butter samples were heated to melting at about 60° C. to erase any crystal memory of the fat. The melt was then cooled at a rate of about 6° C. per minute to about ° C. The first sample was held at about 20° C. for 2 minutes and quickly frozen to −10° C. for later preparation of a DSC melt profile. Subsequent samples were held at 20° C. for 2 hours, 1 day, 4 days, 7 days and 14 days and then quickly frozen to −10° C.

Figure 1:
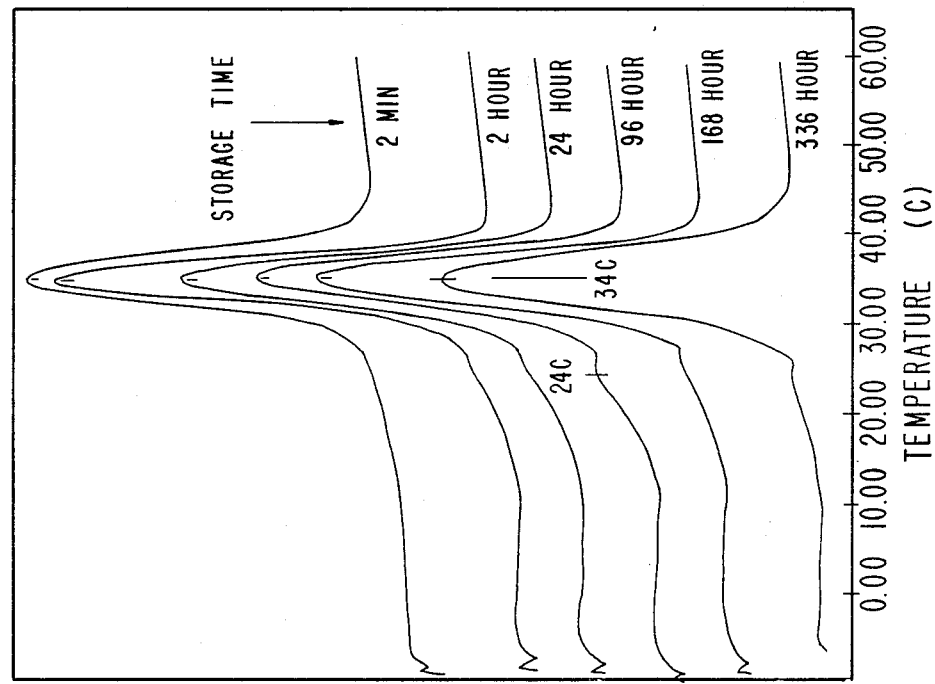
FIG. 1 is a series of DSC melt profiles of a fractionated palm kernel oil hard butter made over a period of two weeks.

DSC melt profiles of each of the stabilized hard butter samples were generated as shown in FIG. 1. As can be seen, the first control sample after 2 minutes displayed a single fairly sharp peak at about 34° C. which demonstrates a substantial absence of different crystalline forms in the stabilized hard butter. At this stage, the control sample had a medium gloss typical in this type of hard butter with no visible bloom.

A series of other DSC melt profiles generated from the remaining samples prepared above are also shown in FIG. 1. The major peak at 34° C. has shifted only an insignificant amount over a period of about 14 days. After about two hours, the samples show a low shoulder at about 24° C. At the end of day 14 the peak at 24° C. tends to merge with the peak at 34° C. and appears as a broad shoulder. No significant amounts of fat bloom were visible. This data shows the fractionated hard butter to be relatively stable with only small amounts of self-fraction and polymorphism.

A commercially available unfractionated, partially hydrogenated and interesterified, palm kernel oil hard butter was melted and cooled in the same manner as above as a control to demonstrate the unstable nature of a hard butter. Approximately 2 minutes after the samples were prepared a DSC thermogram from one of the samples was produced as shown in FIG. 2. As can be seen, the first control sample displayed a broad rounded peak at 36° C. having a shoulder at about 25° C. The melt profile demonstrates the presence of different crystalline forms in the palm kernel oil hard butter due primarily to its self-fractionation and polymorphic characteristics. At this stage the control sample had a medium gloss typical in this type of hard butter composition with no visible bloom.

A series of other DSC thermograms were prepared at 2 minutes, 2 hours, one day, 4 days, 7 days and 14 days as shown in FIG. 2 to display the changes in the crystal structure over time. As can be seen the peak which initially appeared at 35° C. has shifted slightly to 38° C. over a period of 14 days. In addition, the peak has sharpened and become taller in relation to the peak at about 25° C. The peak at 25° C. which became distinguishable after 2 hours did not change appreciably over time. Also after two hours a shoulder at about 30° C. becomes apparent and gradually diminishes over time. At the end of Day 4 a peak at 14° C. becomes apparent which gradually becomes indistinguishable. The changes in the peaks are believed to be due to the polymorphic behavior of the hard-butter through the transformation of the unstable crystals to the more stable form, as well as the tendency for this hard butter to undergo extensive self-fractionation.

EXAMPLE 2

Figure 3:
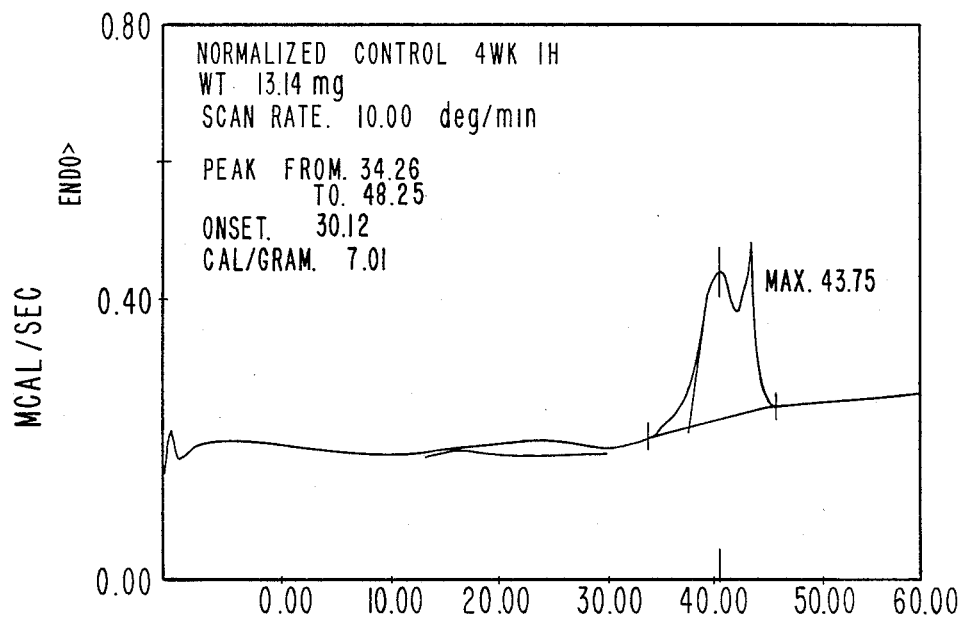
FIG. 3 is a melt profile of a finished unfractionated hard butter confectioner's coating composition at Week 4.

A commercially available confectioner's coating composition was examined to generate data on the changes in crystal structure over a period of time. The composition contained approximately 30 percent by weight partially hydrogenated and interesterified palm kernel oil, 20 percent cocoa powder, and 50 percent sugar with minor amounts of lecithin. The composition was tempered by melting to about 60° C. for 30 minutes to erase all crystal memory and cooled to about 32° C. until a thick consistency was obtained. The composition was carefully reheated to about 37° C. A cookie base cake was dipped into the confectioner's composition and cooled to about 24° C. and stored at a constant temperature. The cookie base cake had a composition essentially as follows:

Sugar: 267 g
Flour: 534 g
Shortening: 121 g
Flavoring solids (cocoa powder, vanillin): 122 g
Water: 108 g
Salt: 6.75 g
Lecithin: 2.25 g The control sample was prepared as above and stored at a constant temperature of 24° C. for a period of four weeks. A DSC thermogram was prepared for this control sample and a melt profile prepared as shown in FIG. 3. The peaks that are normally present on Day 1 are still displayed although changes in the location and height of the peaks have occurred. The peak at about 24° C. appears very broad while the major peak occurring at about 40° C. is a double or split peak. The differences between the melt profiles of FIG. 1 and FIG. 3 are believed to be due primarily to the tempering and possible migration of shortening from the cookie into the confectioner's coating.

The melt profile of a sample after eight weeks in storage at 24° C. will generally show little or no change between the profile after four weeks. This demonstrates the different crystal forms from the fractionation and polymorphism are still present in significant amounts in the composition. After eight weeks the control sample will usually display a definite hazy appearance having lost essentially all of its initial gloss. Although a typical melting profile after four weeks is shown in FIG. 3, occasionally and for unknown reasons the profile may show a reduction in the height of some of the peaks and a narrowing of another peak. This is probably caused by the formation and disappearance of crystals due to its inherent self fractionation and polymorphic characteristics. This occasional display of the narrowing of the peaks is further evidence of the unpredictable nature and difficulty in determining the precise mechanism of fat bloom.

EXAMPLE 3

A confectioner's compound coating composition was obtained having the composition as that in Example 2. While the composition was in the melted condition a commercial grade (Aldrich Chemical Co.) powder adipic acid was added in an amount corresponding to 5.0 percent by weight of the fat present. The particle size distribution of the commercial grade adipic acid ranged between 50 to 150 microns. The adipic acid was thoroughly mixed in the coating composition followed by standard tempering procedures and applied as a coating to enrobe a cookie base cake as in Example 2. The resulting enrobed cookie had a pleasing color and very high gloss. Three identical sample groups were prepared and stored at a constant temperature of 24° C.

Figure 4:
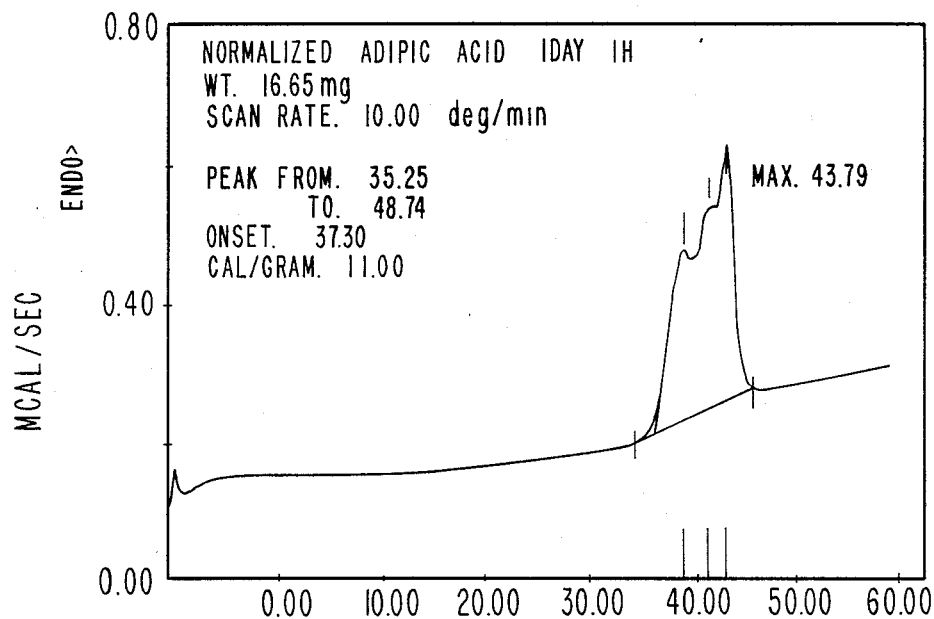
FIG. 4 is a melt profile of a finished unfractionated hard butter coating composition containing 5.0% adipic acid in accordance with the invention on Day 1.
Figure 5:
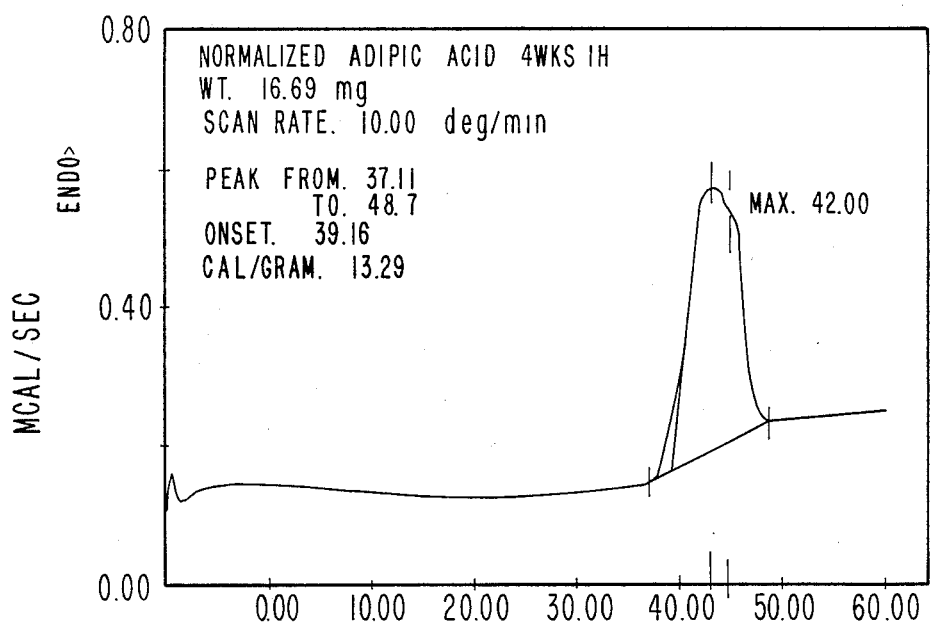
FIG. 5 is a melt profile of a finished unfractionated hard butter coating composition containing 5.0% adipic acid at Week 4.

On Day 1 a melt profile of the first sample was generated by DSC as shown in FIG. 4. As can be seen, four peaks appear between 35° C. and 45° C. corresponding to the different crystal forms. At the end of the fourth week a melt profile was made of a second sample as seen in FIG. 5. By comparing the melt profiles on Day 1 and Week 4 the changes in the crystalline portion of the fat system can be seen. At the end of Week 4 the sharp peaks are no longer apparent and the width of the overall profile tends to be slightly narrower. At the end of the fourth week the enrobed cookie had retained a good glossy appearance with only a slightly lighter color than average. No evidence of fat bloom could be seen.

Figure 6:
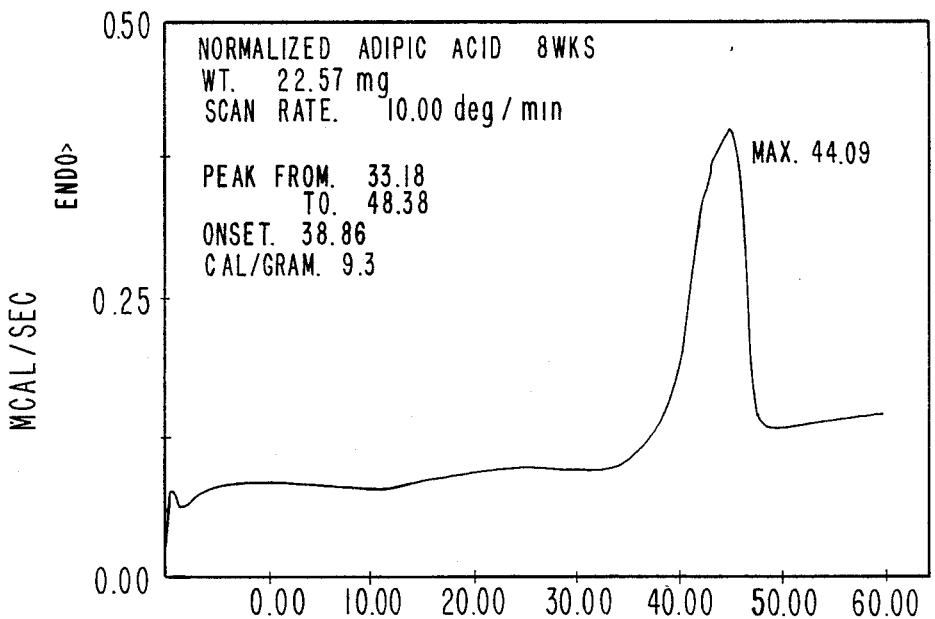
FIG. 6 is a melt profile of a finished unfractionated hard butter coating composition containing 5.0% adipic acid at Week 8.

At the end of eight weeks the third sample of the enrobed cookie still retained a good glossy appearance unlike the control sample containing no adipic acid which was dull and hazy. A melt profile made of the third sample after eight weeks, as shown in FIG. 6, demonstrates a further narrowing of the peak compared to the melt profile after four weeks. The sharp narrow peak of the melt profile made after eight weeks indicates a substantial change in the composition. Although the fat composition is made up of different components, the adipic acid appears to interact with the solid fats and cause the composition to behave as if it were made of a single component and to inhibit self-fractionation.

EXAMPLE 4

Figure 7:
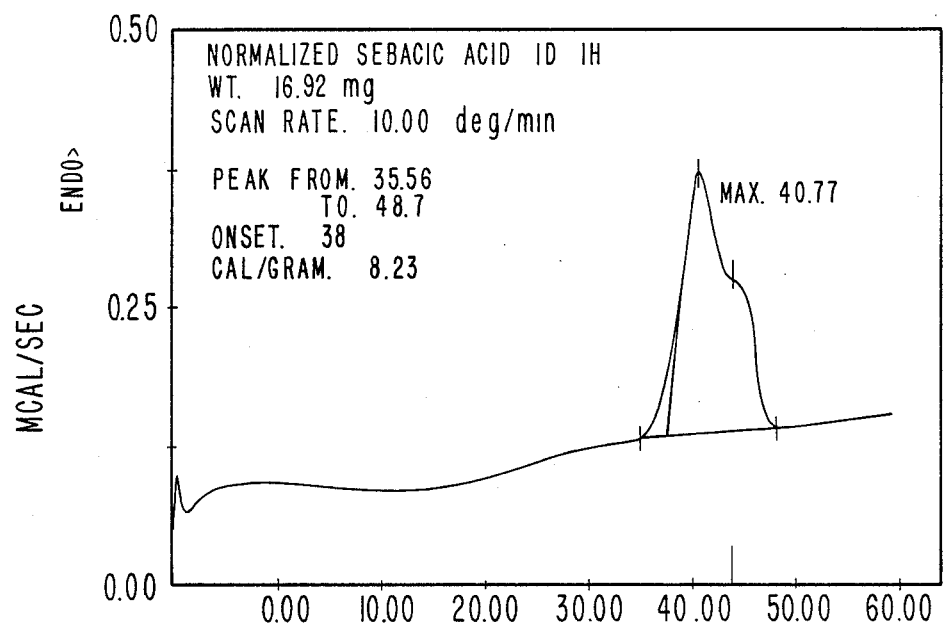
FIG. 7 is a melt profile of a finished unfractionated hard butter coating composition containing 5.0% sebacic acid on Day 1.
Figure 8:
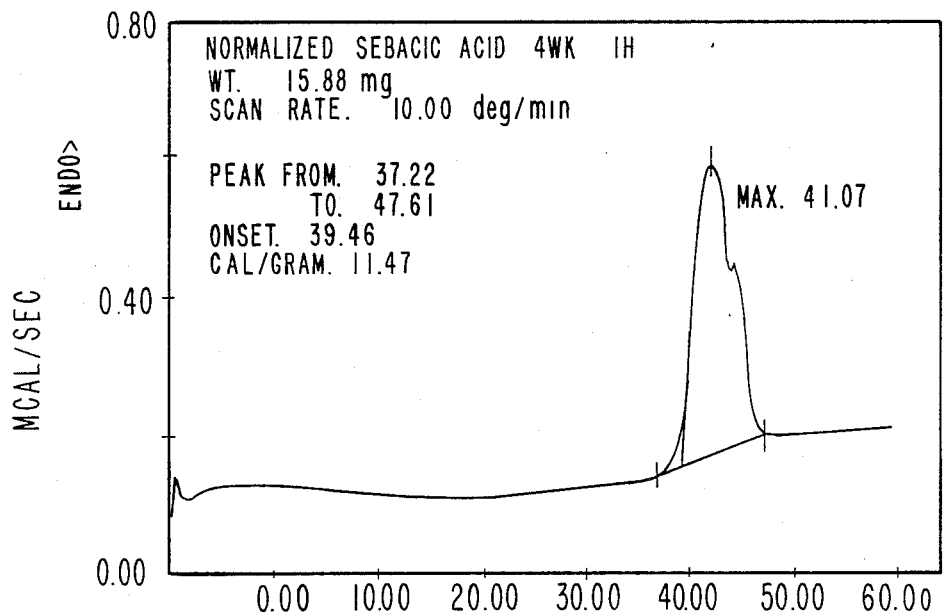
FIG. 8 is a melt profile of a finished unfractionated hard butter coating composition containing 5.0% sebacic acid after Week 4.

A confectioner's compound coating composition prepared according to Example 2 was thoroughly mixed with sebacic acid in an amount of 5.0 percent by weight of fat present. The hard butter composition was again tempered and applied to enrobe a cookie base cake as in Example 2. Three such samples were prepared and stored at a constant temperature of 24° C. On Day 1 the melt profile of the coating composition containing 5.0 percent sebacic acid was prepared as shown in FIG. 7. The distinct peaks corresponding to the different crystal forms of the fat and as in FIG. 2 are not readily distinguishable and appear as a single discontinuous broad peak between 35° C. and 50° C. with a shoulder at about 44° C. At the end of Week 4 the second sample was analyzed by preparing a melt profile as shown in FIG. 8. At the end of four weeks the melt profile has narrowed to produce a sharper peak. On Day 1 the samples had a very high gloss surface which was essentially unchanged after week four. At the end of Week 4 only a slightly lighter color change was apparent but no visible bloom had occurred.

Figure 9:
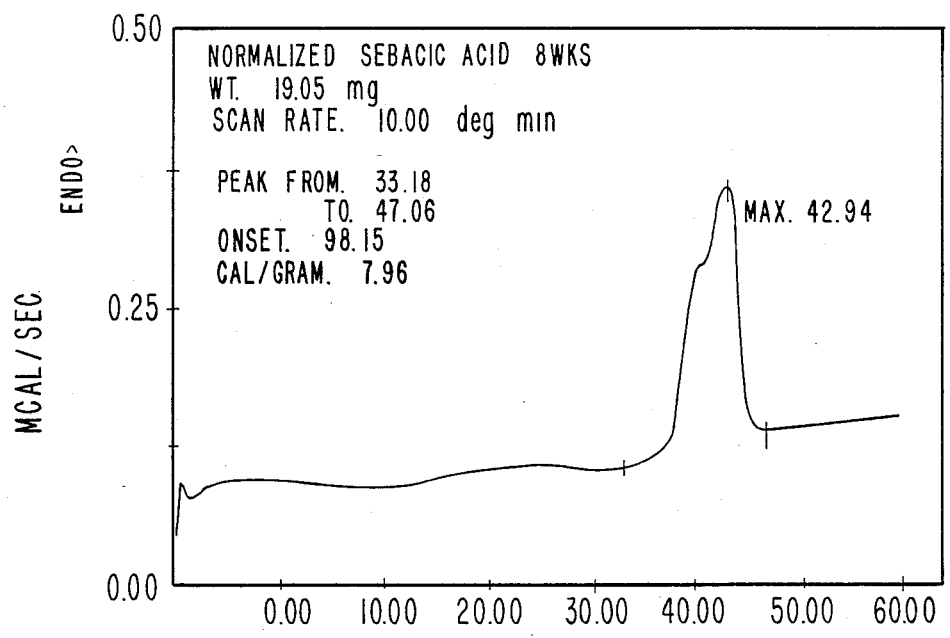
FIG. 9 is a melt profile of a finished hard butter coating composition containing 5.0% sebacic acid after Week 8.

At the end of Week 8 the third sample exhibited a very good gloss that was essentially unchanged from Day 1 with only a slight color change. FIG. 9 shows the melt profile of the third sample after eight weeks. The peak has changed only slightly compared to the melt profile of FIG. 3 but is slightly narrower. The melt profiles of FIGS. 7, 8 and 9 demonstrate a change in the behavior of the fat crystals to resist the tendency of self-fractionation which is common in confectioner's compositions. This stabilization is slower than that experienced with the adipic acid, but when compared to the melt profiles of the control samples containing no dicarboxylic acid the peaks are considerably sharper, demonstrating an increased resistance to fat bloom and exhibiting an increase in gloss retention.

EXAMPLE 5

A confectioner's coating composition was again prepared as in Example 2 and mixed with decane dicarboxylic acid in an amount corresponding to 5.0 percent by weight. The coating composition was tempered and applied to enrobe three groups of cookie base cakes as in Example 2. The three sample groups were stored at a constant temperature of 24° C.

Figure 10:
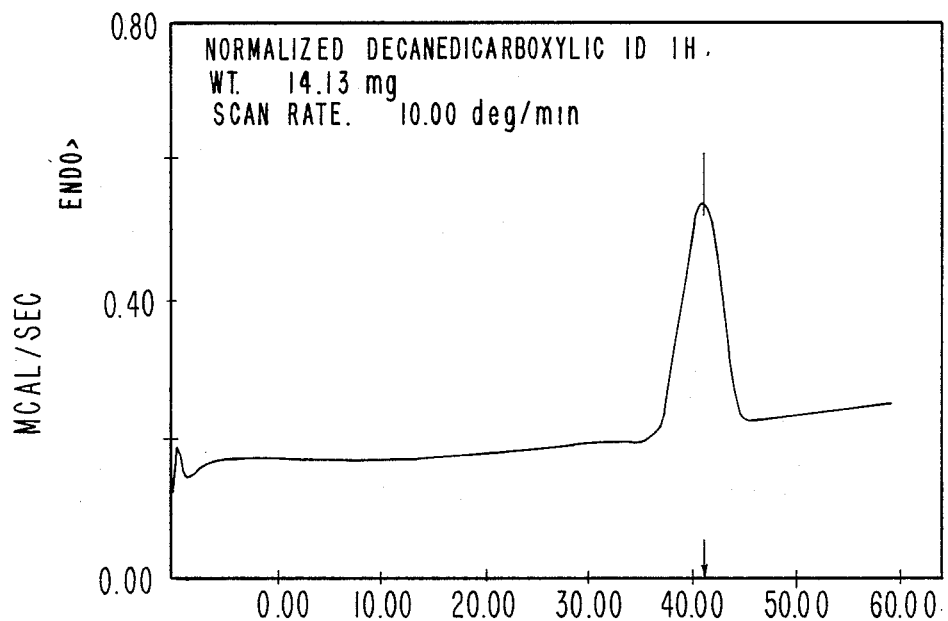
FIG. 10 is a melt profile of a finished unfractionated hard butter coating composition containing 5.0% decane dicarboxylic acid on Day 1.
Figure 11:
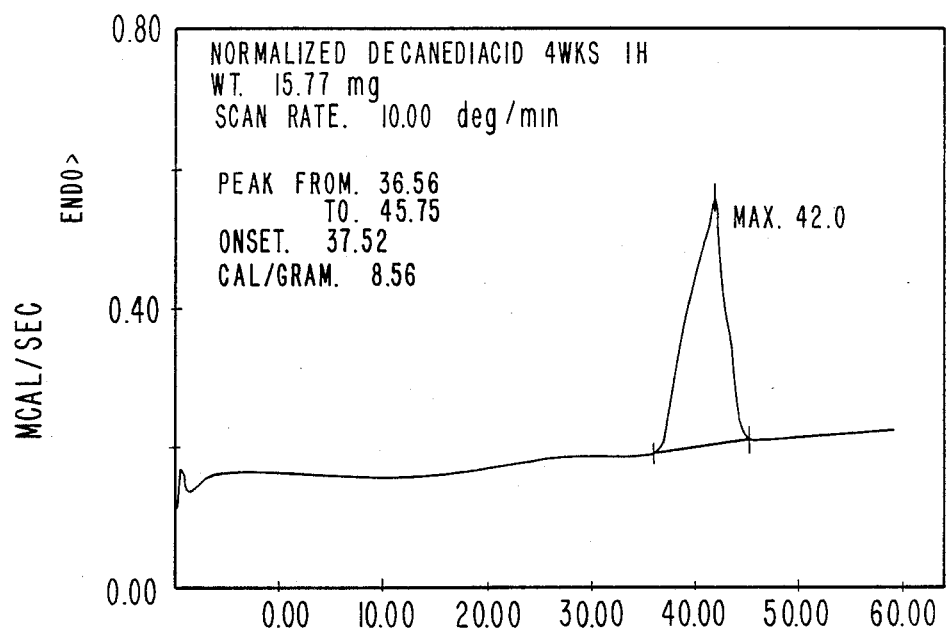
FIG. 11 is a melt profile of a finished unfractionated hard butter coating composition containing 5.0% decane dicarboxylic acid after Week 4.
Figure 12:
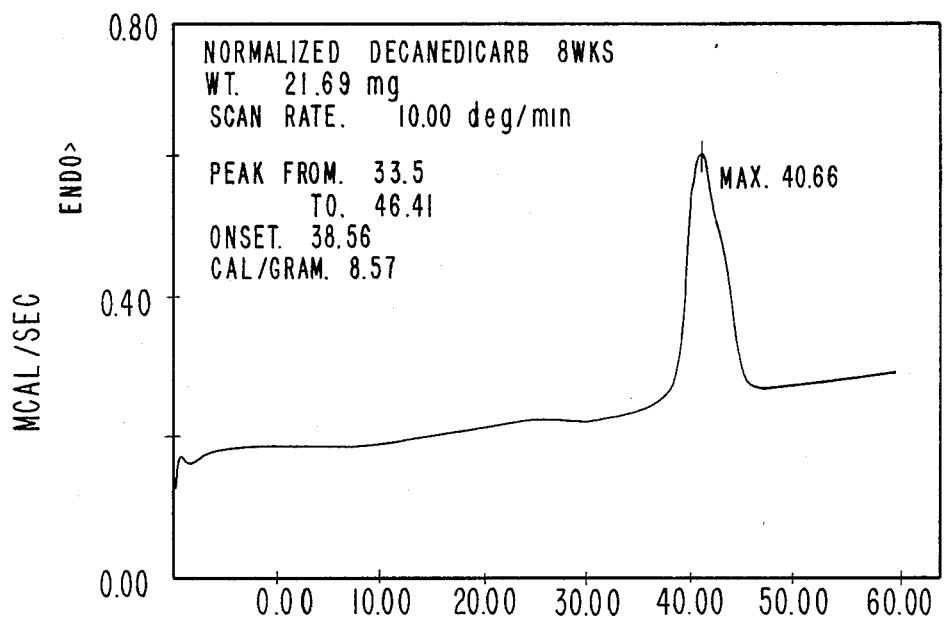
FIG. 12 is a melt profile of a finished unfractionated hard butter coating composition containing 5.0% decane dicarboxylic acid after Week 8.

On Day 1 all the samples had a very high gloss and a dark brown color. A melt profile of the first sample made on Day 1 is shown in FIG. 10 and reveals a single sharp peak at 42° C. At the end of Week 4 and Week 8 the second and third samples were examined and displayed a good gloss with only minimal change between Day 1. The color of the samples after the fourth and eighth week was slightly lighter than that found on Day 1. The melt profiles of the second and third samples prepared after the fourth and eighth week respectively showed little change to the melt profile made on Day 1 as shown in FIG. 11 and FIG. 12. The melt profiles showed only a single sharp peak which gradually narrowed over time. The addition of decane dicarboxylic acid to the coating composition demonstrates a very rapid stabilization of the fat system as compared to the control sample. The acid appears to encourage the fats to act as if made of a single component with a fairly narrow melting point range by inhibiting self-fractionation. The samples prepared including 5.0 percent decane dicarboxylic acid showed no tendency for fat bloom.

EXAMPLE 6

Figure 13:
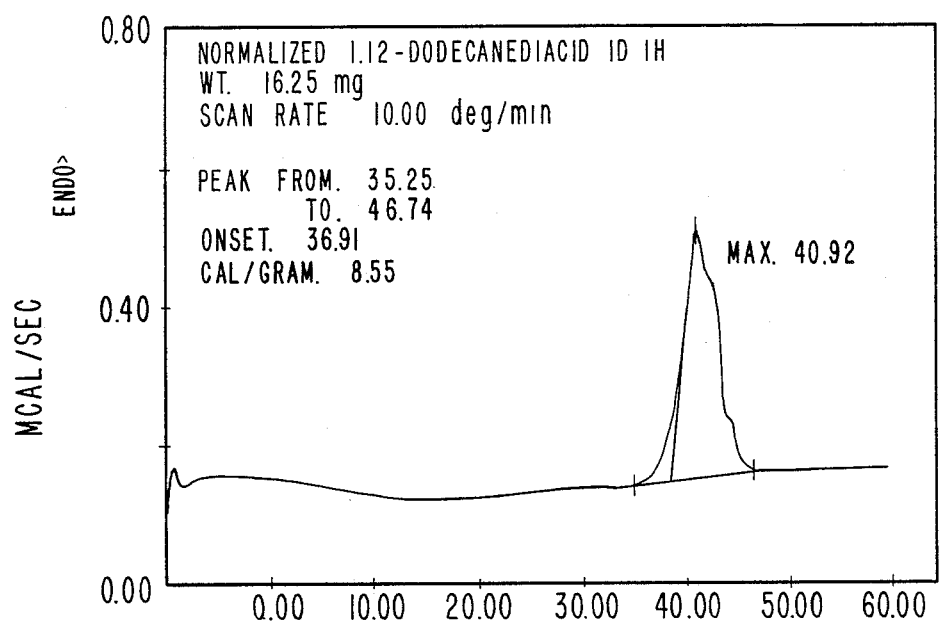
FIG. 13 is a melt profile of a finished unfractionated hard butter coating composition containing 5.0% 1,12-dodecane dicarboxylic acid on Day 1.
Figure 14:
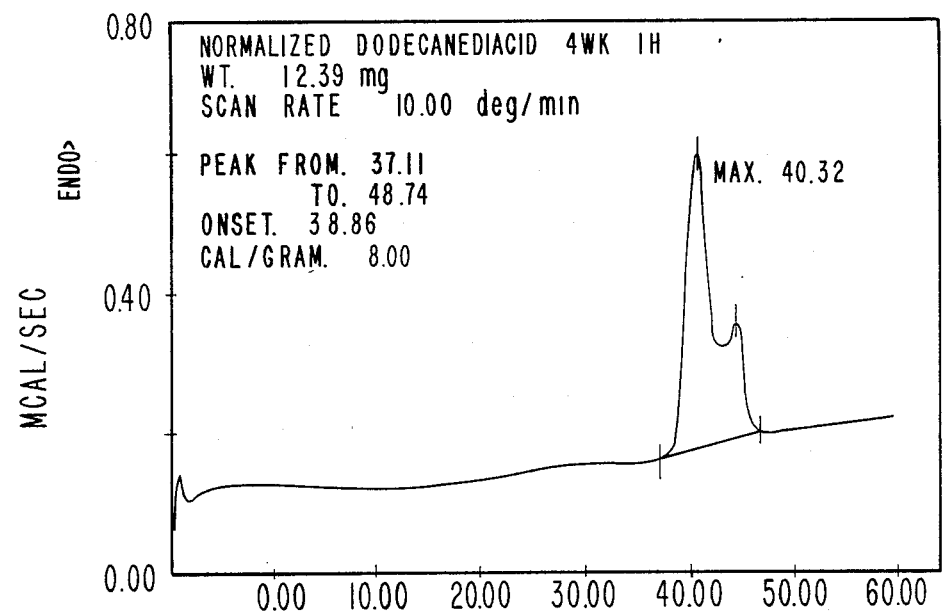
FIG. 14 is a melt profile of a finished unfractionated hard butter coating composition containing 5.0% 1,12-dodecane dicarboxylic acid after Week 4.
Figure 15:
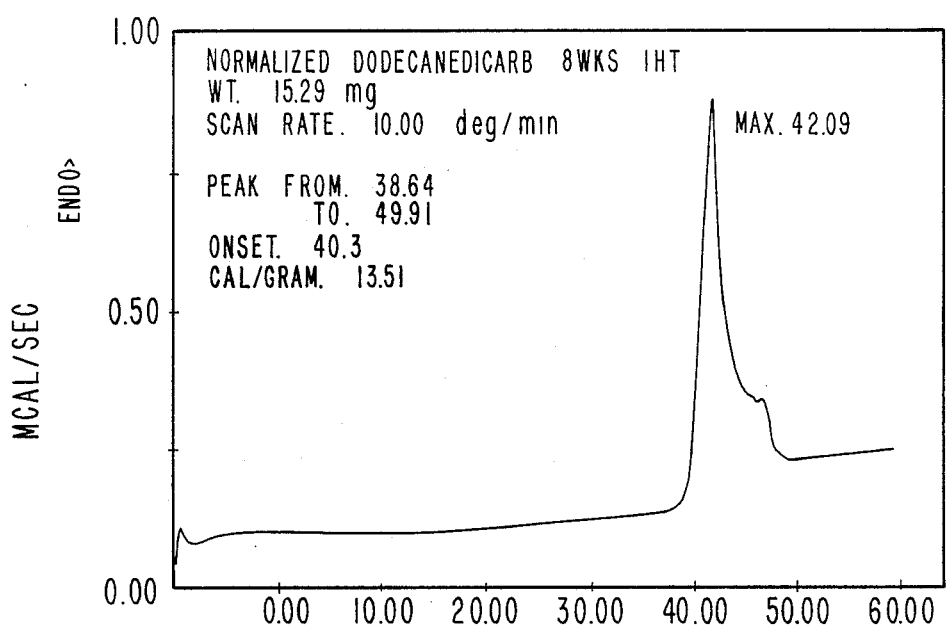
FIG. 15 is a melt profile of a finished unfractionated hard butter coating composition containing 5.0% 1,12-dodecane dicarboxylic acid after Week 8.

A confectioner's coating composition was again prepared as in Example 2. Dodecane dicarboxylic acid having a particle size distribution ranging between 50 to 150 microns was added to the finished hard butter composition followed by thorough mixing. As in the previous examples the acid was added in an amount of 5.0 percent by weight of fat present. The coating composition was applied to enrobe a cookie base cake as in Example 2 to produce three sample groups. The samples were again stored at a constant temperature of 24° C. On Day 1 the samples exhibited a very high gloss and a dark brown color. At the end of Day 1 the first sample was analyzed by preparing a melt profile as shown in FIG. 13. The melt profile demonstrates a fairly sharp peak at about 42° C. indicating a narrow melting point range and a stabilizing effect of the acid. The crystal forms due to self-fractionation of the fats are shown to be present only in minor amounts as indicated by the shoulders of the peak and the absence of peaks melting below 30° C. At the end of Week 4 the samples still retained the very high gloss with little or no change in color. The melt profile of the sample after Week 4 (FIG. 14) shows a sharpening of the peak at about 40° C. which is narrower than the peak after Day 1. A second peak at about 44° C. becomes present at the end of Week 4 and is probably due to the formation of a crystal form as the result of self-fractionation or polymorphism. At the end of Week 8 (FIG. 15) the peak at 40° C. becomes taller and sharper although the peak at 44° C. is still visible. This continued narrowing and sharpening of the peak demonstrates a rapid stabilization of the fat. The peak at 44° C. is still present but smaller and tends to blend with the peak at 40° C. further evidencing the stabilization effect of the dodecane dicarboxylic acid.

EXAMPLE 7

The effect of adipic acid on the viscosity of hard butter was determined using a Brookfield viscosimeter, Model #HATD with a No. 18 spindle at 38° C. The hard butter tested was a commercially available palm kernel oil (PKO) which had been partially hydrogenated and interesterified. A number of samples were prepared from the hard butter to determine the effects of the dicarboxylic acid in the tempered and untempered composition. Adipic acid was added to the untempered hard butter samples in the amount of 0.3 percent, 2.0 percent and 5.0 percent by weight of fat. The samples were carefully mixed to uniformly distribute the adipic acid throughout the sample. Portions of the samples containing the 0.7, 2.0 and 5.0 percent adipic acid were then tempered using standard procedures for hard butters. For comparative purposes a control sample containing no adipic acid was also prepared from the tempered and untempered hard butter. The particle size distribution of the adipic acid ranged predominantly between 50 and 150 microns. The viscosity of all the samples was measure at 38° C. The viscosity of the tempered and untempered control samples and the tempered and untempered adipic acid containing samples are as shown in Table 1.

TABLE 1

| | ALL VALUES FOR PALM KERNEL OIL ARE IN CENTIPOISE. | | | |
|---|---|---|---|---|
| RPM | 0% Adipic acid | 0.3% Adipic acid | 2% Adipic acid | 5% Adipic acid |
| Tempered | | | | |
| 5.0 | — | 57.6 | — | — |
| 10 | — | 41.6 | 62.9 | 48.0 |
| 20 | 40.0 | 40.0 | 53.8 | 43.7 |
| 50 | 36.3 | 36.5 | 49.7 | 40.9 |
| 100 | 35.5 | 35.8 | 47.4 | 40.3 |
| Untempered | | | | |
| 5 | — | — | — | 44.8 |
| 10 | — | 41.6 | 38.4 | 35.2 |
| 20 | 33.6 | 33.6 | 33.6 | 33.6 |
| 50 | 30.8 | 31.4 | 32.0 | 31.2 |
| 100 | 30.0 | 30.4 | 31.2 | 31.0 |

Similar samples were then prepared from a commercially available confectioner's coating composition coating as in Example 2 comprising partially hydrogenated and interesterified palm kernel oil. The finish coating composition is sold under the trade name Ambrosia S-5252-K by Ambrosia Chocolate Company. The coating composition contained approximately 32 percent by weight fat and about 68 percent solids. An untempered control sample containing no adipic acid and untempered samples containing 0.2 percent, 3.0 percent and 5.0 percent adipic acid by weight were then prepared by thoroughly mixing the acid in the melted composition. Tempered samples of the confectioner's coating composition were then prepared by mixing adipic acid to untempered samples in the amount of 0.2, 3.0 and 5.0 percent by weight of fat followed by tempering. The composition was tempered by melting the composition which was then carefully cooled to 32° C. until a thick consistency was obtained followed by careful reheating to 37° C. A tempered control sample of the confectioner's composition was also prepared which did not contain any adipic acid.

The viscosities of the tempered and untempered control samples and the adipic acid containing samples were again measured at 38° C. using a No. 18 spindle as set forth in Table 2. In each case, the addition of adipic acid to the hard butter and compound coating composition did not effect the viscosity, thus evidencing that no chemical reaction occurs or change in chemical composition is caused by the acid.

This data demonstrates that adipic acid has no interaction with the fat in the liquid phase of the hard butter or the confectioner's coating composition since no significant viscosity changes occurred. It is therefore presumed that the stabilizing effect of the diacids is achieved via interaction with the crystal matrix of solid fat, a physical-chemical event that cannot be assessed by viscometric analysis.

TABLE 2

ALL VALUES ARE IN POISE.

| RPM | 0% Adipic acid | 0.3% Adipic acid | 2% Adipic acid | 5% Adipic acid |
|---|---|---|---|---|
| Tempered | | | | |
| 0.5 | 594.7 | 457 | 520 | 496 |
| 1.0 | 365.3 | 282 | 320 | 306 |
| 2.5 | 201.3 | 155.5 | 175.5 | 168 |
| 5.0 | 134 | 104.3 | 116 | 111.7 |
| 10 | 93.7 | 74.2 | 81 | 78.5 |
| 20 | 70.5 | 57.1 | 60.6 | 59.7 |
| 50 | 54.3 | 46.9 | 47.8 | 47.9 |
| Untempered | | | | |
| 0.5 | 82.3 | 64.5 | 76.7 | 80 |
| 1.0 | 49.9 | 39.8 | 46.3 | 50 |
| 2.5 | 27.3 | 22.1 | 25.7 | 28.1 |
| 5 | 18.3 | 15.1 | 17.3 | 19.3 |
| 10 | 13.1 | 10.9 | 12.4 | 14.1 |
| 20 | 10.2 | 8.7 | 9.6 | 11.3 |
| 50 | 8.3 | 7.3 | 8.0 | 9.4 |

EXAMPLE 8

To examine the effects of the particle size on the prevention of fat bloom, samples were prepared from the confectioner's coating composition as described in Example 2. A commercial grade adipic acid was reduced to a particle size of 20 microns. This particle size of the adipic acid corresponds essentially to the size of the dry milk solids, cocoa powder and sugar in the finished composition. Two groups of test samples were prepared by mixing the adipic acid in the confectioner's composition at concentrations of 1.0 percent, 0.5 percent and 0.25 percent by weight of fat present. The adipic acid containing fat compositions were then used to enrobe a cookie base cake as prepared in Example 2. A control sample containing no adipic acid was also used to enrobe a similar cookie base cake. All of the enrobed cookies had a very high and uniform gloss. The two groups were then separated and the first group stored at a constant temperature of 26° C. with the second group being stored at 22° C.

At the end of one month the first group of samples stored at 26° C. was examined. At this time some of the control samples displayed small patches of fat bloom. All of the control samples had lost all of the initial gloss and were completely covered by a dull haze. The samples containing 1.0 percent and 0.5 percent adipic acid had similarly lost all of the initial gloss and exhibited a slight haze on the surface. The adipic acid containing samples did not show any effects of fat bloom. The sample containing 0.25 percent adipic acid showed no evidence of fat bloom and had a good gloss similar to that found on Day 1.

At the end of one month the second group of samples stored at 22° C. was examined and compared with the first group of samples. After storage at 22° C. the controlled samples containing no adipic acid exhibited a greater occurrence of fat bloom than the control samples stored at 26° C. The control samples had also lost all of their initial gloss and were completely covered by a dull haze. The samples containing 1.0 percent and 0.5 percent adipic acid exhibited only occasional patches of fat bloom and were completely covered with a dull haze and had lost all of their initial gloss. The sample containing 0.25 percent adipic acid had only a very slight haze and exhibited no evidence of fat bloom.

A comparison of these results revealed that the smaller particles of about 20 microns are more effective at lower concentrations than the larger particle size distribution of 50-150 microns. Conversely, the larger particle size is more effective at higher concentrations. It is believed the difference is the result of crystal nucleation caused by the high surface area of the small particle size. The large particle size of the adipic acid has a smaller surface area thereby being less prone to crystal nucleation stabilization.

In Examples 9-12 as set forth below, comparative studies were carried out to examine the effects of fat bloom in relation to the amount of adipic acid present. The adipic acid in these examples was the commercial grade having a random particle size distribution ranging between 50 and 150 microns. The samples employed were prepared from a finished coating composition based on 32 percent by weight partially hydrogenated and interesterified palm kernel oil and using the composition to enrobe a cookie base cake as prepared in Example 2 above. All of the samples were stored at 24° C. for the times indicated. The times are measured from Day 0 when the coatings were made and applied to the cookie base cake.

EXAMPLE 9

Figure 16:
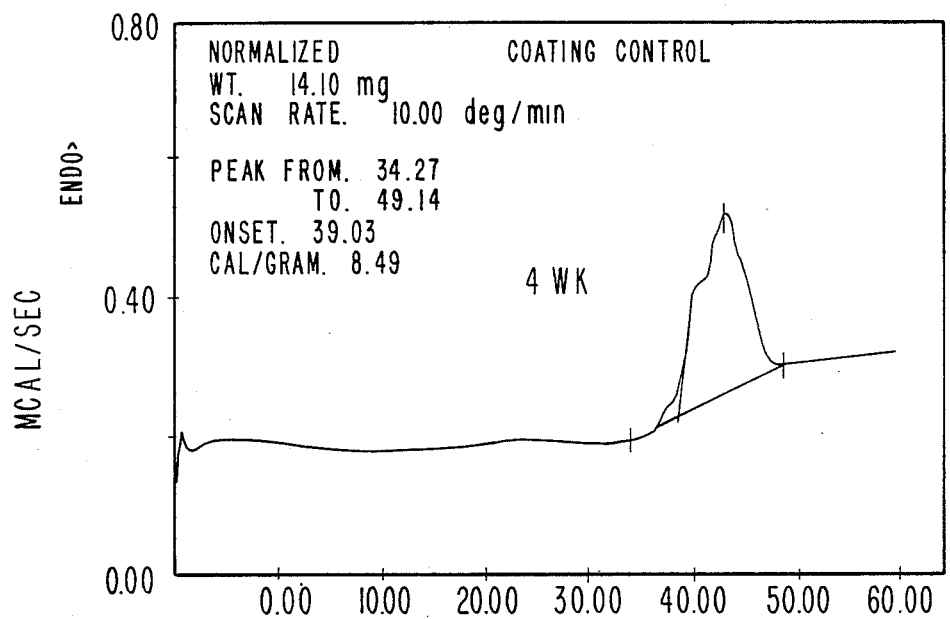
FIG. 16 is a melt profile of a finished unfractionated hard butter coating composition after Week 4.

A control sample comprising a cookie base cake as in Example 2 enrobed with a confectioner's composition where the coating contained no adipic acid was prepared and stored at a constant temperature of 25° C. At the end of four weeks the control sample had lost all of its initial gloss and was covered with a dull haze. No bloom was apparent, however, as characterized by the white deposit. A DSC melt profile was then prepared as shown in FIG. 16. The profile reveals the polycrystalline nature of the composition caused by fractionation or polymorphism as characterized by the several peaks positioned close to each other and forming a broad melting point range. This broad melting point range and the broad peak are typical for this type of composition.

EXAMPLE 10

Cookie base cakes as prepared above were enrobed with the finished palm kernel oil confectioner's coating composition of Example 2 containing 0.3 percent adipic acid by weight of fat in the system having a particle size distribution of 50-150 microns. On Day 1 a DSC melt profile was prepared from one of the samples as shown in FIG. 17 and displays a much sharper and narrower peak compared to the broad melt profile as shown in FIG. 2 of a similar control sample containing no adipic acid. Also shown in FIG. 19 is a melt profile of a second sample after being stored for four weeks at a constant temperature of 24° C. At the end of four weeks the melt profile is sharper and narrower than that found on Day 1. The sharpness of the peaks demonstrates a stabilization effect from the adipic acid. The continued sharpening of the peak after four weeks demonstrates a continued stabilization of the fats. The low melting point fraction at about 28° C., which is typical for confectioner's compositions from hydrogenated palm kernel oil, is also slightly decreased as a result of incorporation of 0.3% adipic acid into the coating.

EXAMPLE 11

Enrobed cookie base cakes were again prepared from a partially hydrogenated and interesterified palm kernel oil confectioner's coating composition as described in Example 2. The coating composition included 2.0 percent by weight adipic acid having a particle size distribution of 50 to 150 microns. On Day 1 a first sample was analyzed using a DSC melt profile as shown in FIG. 18. The melt profile showed a single peak which was quite narrow compared to the samples containing no adipic acid as shown in FIG. 2. At the end of Week 4 and Week 8 samples were again analyzed by preparing a melt profile as shown in FIG. 18. The melt profiles after Week 4 and Week 8 differ only slightly from the melt profile from Day 1. It is thus apparent that most of the stabilizing effects of adipic acid at the 2.0 percent concentration have occurred essentially during the processing step and that fat crystal stabilization is maintained over the next four to eight weeks.

EXAMPLE 12

A number of samples were prepared from the palm kernel oil confectioner's coating composition containing 5.0 percent adipic acid by weight and used to enrobe a cookie base cake as described above. A melt profile was generated from one of the samples on Day 1 as shown in FIG. 19. The melt profile demonstrates a broad melting point range and shows a number of distinct peaks typical in a fat composition containing no adipic acid. The remaining samples were stored at a constant temperature of 25° C. and sequentially analyzed. At the end of Week 4, Week 8, Week 16 and Week 20 melt profiles were prepared as shown in FIG. 19. As can be seen the peaks of the melt profile gradually narrow and sharpen over time demonstrating a time dependent stabilization effect of adipic acid at 5.0 percent concentration. At the end of eight weeks the melt profile peak has sharpened to indicate a reduction in the number of different crystal forms. The above melt profiles and test data demonstrate a direct relationship between the presence of a dicarboxylic acid in the fat composition and fat bloom prevention and gloss retention. The above data further demonstrate the acids do not react with or modify the fats in the liquid phase but rather only interact with the crystal phase. The dicarboxylic acids do appear to have a stabilizing effect on the fats by inhibiting self-fractionation of the different fat components and encouraging the fat composition to exhibit a fairly narrow monomorphic melt profile. Although the effects of dicarboxylic acids on the prevention of fat bloom have been examined using only specified dicarboxylic acids these examples are not intended to be considered limiting as numerous other acids can be employed by one skilled in the art. The use of the dicarboxylic acids as described herein are intended to be used in conjunction with standard processing and tempering steps commonly employed in preparing hard butter, confectioner's compositions and similar composition coatings.

The present invention is primarily directed to confectioner's coatings which are used to enrobe an edible base using conventional enrobing techniques. The type of edible base can vary widely including those with a high fat content or high moisture contents. The above examples disclose a cookie coated with a confectioners coating composition, however, the base may alternatively be a creme filled sandwich cookie, breads, rolls, pastries, pasta, fried or baked farinaceous snack foods such as corn and potato chips or tortillas, expanded dough products, breakfast cereals, creme base, and candy or confectionery such as a caramel, fondant, or marzipan. The bloom inhibiting additives are particularly suitable for inhibiting fat bloom of the confectioner's coating where the center has a high fat content which can diffuse from the center to the coating as is common with coated peanuts, peanut butter, walnuts, almonds and pecans or confectionery centers containing nuts as is typical in candies. Alternatively, the base may be a dried fruit such as raisins, dried apples, apricots or bananas or the base may be made from a fruit paste or jelly made from figs, blueberries, applies, bananas, apricots, strawberries or raisins. Confectioner's compositions containing the novel fat bloom inhibitors can be used in any fashion as such compositions are conventionally in the industry.

The confectioner's coating composition in the above examples was a chocolate-flavored PKO composition. It is to be recognized that any desired flavoring or coloring may be used in the confectioner's composition as is typically employed in the industry. In addition, the fat composition may be made up of one or more confectionery compositions typically used in the industry including, but not limited to chocolate, and the hard butter compositions of cocoa butter, palm, palm kernal, soybean, corn, rapeseed, illupe oil, phulwara, coconut, peanut and cottonseed oil.

The detailed description of the invention is provided for purposes of illustrating the preferred embodiment of the invention. It will be recognized by those skilled in the art that the preferred embodiment is not intended to limit the present invention to the particular acids and methods of processing as they may be readily modified by those skilled in the art. It will be further apparent that the numerous other modifications not mentioned herein can be made without departing from the spirit in scope of the invention as claimed in the following claims.

What is claimed is:

1. A stabilized hard butter composition having a resistance to fat bloom comprising a mixture of at least one hard butter made up of a mixture of triglycerides and fatty acids and an effective amount of a fat bloom inhibitor comprising at least one dicarboxylic acid having the formula:

$$HO_2C-R-CO_2H$$

wherein R is an alkyl or alkenyl moiety having 4 to 22 carbon atoms; or, $(CH_2)_x-R_1-(CH_2)_y$ wherein $R_1$ is an aryl moiety, —O—, —NH—, CO—NH—, —$CO_2$— or —CO— and x and y are 0 or an integer from 1 to 22 provided that the sum of (x+y) is an integer from 4 to 22.

2. The hard butter composition of claim 1 wherein said dicarboxylic acid is a straight chain alkyl having 4 to 14 carbon atoms.

3. The hard butter composition of claim 1 wherein said dicarboxylic acid is selected from the group consisting of malonic, adipic, pimelic, sebacic, decandioic, dodecandioic, 4-aza-5-keto-1, 10-decanedioic acid, 5-oxo-1,9-nonanedioic acid, 4-keto-1,7-heptanedioic acid, 4-octene-1,8-dioic acid and p-pentanoic benzoic acid.

4. The hard butter composition of claim 1 wherein said dicarboxylic acid is an alpha amino dicarboxylic acid.

5. The hard butter composition of claim 1 wherein said dicarboxylic acid is an unsaturated dicarboxylic acid comprising 3-hexenedioic acid.

6. The hard butter composition of claim 1 wherein the hard butter is selected from the group consisting of cocoa butter, palm, palm kernel, soybean, corn, rapeseed, illipe oil, phulwara, coconut, peanut, and cotton seed oil.

7. The hard butter composition of claim 1 wherein the hard butter is fractionated, partially hydrogenated or interesterified.

8. The hard butter composition of claim 7 further comprising 50% to about 80% by weight suspended solids selected from the group consisting of sugar and flavorants.

9. The hard butter composition of claim 8 wherein the hard butter composition is chocolate comprising cocoa butter, sugar, milk solids, cocoa powder and lecithin.

10. A fat bloom resistant confectionery coating composition comprising a mixture of:
(a) a confectionery composition of 20 to 50% fat or shortening by weight and 50 to 80% suspended solids by weight selected from the group consisting of sugar and flavorants; and
(b) at least one dicarboxylic acid fat bloom inhibitor selected from the formula $$HO_2C-R-CO_2H$$

wherein n is an alkyl or alkenyl having 4 to 22 carbon atoms; or $(CH_2)_x-R_1-(CH_2)_y$ wherein $R_1$ is an aryl moiety, —O—, —NH—, —CO—$NH_2$, —$CO_2$—, —CO— and x and y are 0 or an integer from 1 to 22 provided that a the sum of (x+y) is an integer from 4 to 22.

11. The fat bloom resistant coating composition of claim 10 wherein the fat is a hard butter selected from the group consisting of palm, cocoa butter, palm kernel, rapeseed soybean, corn, illipe, phulwara, coconut, peanut and cottonseed oil.

12. The fat bloom resistant coating composition of claim 11 wherein the hard butter is fractionated, partially hydrogenated or interesterified.

13. The fat bloom resistant coating composition of claim 10 wherein said suspended solids comprise sugar, milk solids and cocoa particles.

14. The fat bloom resistant coating composition of claim 10 wherein said coating composition is chocolate comprising cocoa butter, milk solids, sugar, cocoa powder and lecithin.

15. The fat bloom resistant coating composition of claim 10 wherein R is an alkyl having 4 to 14 carbon atoms.

16. The fat bloom resistant coating composition of claim 10 wherein said dicarboxylic acid is selected from the group consisting of malonic, adipic, pimelic, sebacic, 3-hexendioic, decandioic and dodecandioic, 4-aza-5-keto-1,10-decanedioic acid, 5-oxo-1,9-nonanedioic acid, 4-keto-1,7-heptanedioic acid, 4-octene-1,8-dioic acid and p-pentanoic benzoic acid.

17. The fat bloom resistant coating composition of claim 10 wherein said dicarboxylic acid is suspended in the fat or shortening and has a particle size from between 5 to 200 microns.

18. The fat bloom resistant composition of claim 1 or 10 wherein said dicarboxylic acid has a particle size of about 20 microns.

19. The fat bloom resistant composition of claim 1 or 10 wherein said dicarboxylic acid has a particle size of between 50 and 150 microns.

20. The fat bloom resistant composition of claim 1 or 10 wherein said dicarboxylic acid is present in an amount of about 0.1 to 5.0% by weight of fat or shortening.

21. The fat bloom resistant composition of claim 1 or 10 wherein said dicarboxylic acid is present in an amount of about 0.25% by weight of fat or shortening.

22. The fat bloom resistant composition of claim 1 or 10 wherein said dicarboxylic acid is present in an amount of about 5.0% by weight of fat or shortening.

23. The fat bloom resistant composition of claim 1 or 10 wherein said dicarboxylic acid has a particle size of about 20 microns and is present in the amount of about 0.25% by weight of fat or shortening.

24. The fat bloom resistant composition of claim 10 wherein said dicarboxylic acid has a particle size greater than 50 microns and is present in an amount of 5.0% by weight of fat or shortening.

25. A method of inhibiting fat bloom and prolonging surface gloss of a fat based composition which is firm at room temperature comprising the steps of:
(a) liquefying a fat based composition;
(b) uniformly dispersing in said composition to form a mixture, at least one fat bloom inhibiting agent comprising at least one dicarboxylic acid having the formula:

$$HO_2C-R-CO_2H$$

wherein R is an alkyl or alkenyl having 4 to 22 carbon atoms; or $(CH_2)_x-R_1-(CH_2)_y$ wherein $R_1$ is an aryl moiety, —O—, —CO—NH—, $CO_2$—, —NH— or —CO— and x and y are 0 or an integer from 1-22 provided that the sum of (x+y) is an integer from 4 to 22; and (c) solidifying the composition.

26. The method of claim 25 wherein said fat based composition is liquified by heating to a temperature of 35° to 70° C.

27. The method of claim 25 further including the step of tempering the fat based composition.

28. The method of claim 25 wherein said fat based composition is an edible hard butter, triglyceride or shortening composition containing 20 to 50% hard butter, triglyceride or shortening and 50% to 80% suspended solids selected from the group consisting of sugar and flavoring agents.

29. The method of claim 25 wherein said fat based composition is a hard butter compound coating composition.

30. The method of claim 29 wherein the hard butter composition comprises at least one hard butter selected from the group consisting of palm, palm kernel, rapeseed, cocoa butter, soybean, corn, illipe, phulwara, coconut, peanut and cottonseed oil.

31. The method of claim 30 wherein said hard butter is fractionated, partially hydrogenated or interesterified.

32. The method of claim 25 wherein said fat containing composition is chocolate comprising cocoa butter, milk solids, sugar, cocoa powder and lecithin.

33. The method of claim 26 further including the step of mixing the dicarboxylic acid in the liquified fat composition for 1 to 120 minutes.

34. The method of claim 25 wherein said dicarboxylic acid is an alkyl diacid having 4 to 14 carbon atoms.

35. The method of claim 25 wherein said dicarboxylic acid is selected from the group consisting of malonic, adipic, pimelic, sebacic, 3-hexendioic, decandioic, dodecandioic, 4-aza-5-keto-1,10-decanedioic acid, 5-oxo-1,9-nonanedioic acid, 4-keto-1,7-heptanedioic acid, 4-octene-1,8-dioic acid and p-pentanoic benzoic acid.

36. The method of claim 25 wherein said dicarboxylic acid has a particle size distribution of about 10 to 200 microns.

37. The method of claim 36 wherein said dicarboxylic acid has a particle size of about 20 microns.

38. The method of claim 36 wherein said dicarboxylic acid has a particle size of about 50 to 150 microns.

39. The method of claim 25 wherein said dicarboxylic acid is combined with said fat composition in an amount of about 0.1 to 5.0% by weight of fat.

40. The method of claim 30 wherein said dicarboxylic acid is combined with said fat composition in an amount of about 0.25% by weight of fat.

41. The method of claim 39 wherein said dicarboxylic acid is combined with said fat composition in an amount of about 5.0% by weight of fat.

42. A confectionery comprising an edible based enrobed in a fat based confectionery coating composition which is firm at room temperature and comprises a mixture of 20% to 50% fat, 50% to 80% suspended solids by weight selected from the group consisting of sugar and flavorants and a fat bloom inhibitor comprising at least one dicarboxylic acid having the formula:

$$HO_2C-R-CO_2H$$

wherein R is an alkyl or alkenyl having 4 to 22 carbon atoms; or $(CH_2)_x-R_1-(CH_2)_y$ wherein $R_1$ is an aryl moiety, —O—1, —CO—NH—, $CO_2$—, —CH— or —CO— and x and y are 0 or an integer from 1–22 provided that the sum of (x+y) is an integer from 4 to 22.

43. The confectionery of claim 42 wherein said edible base is a farinaceous composition selected from the group consisting of bread, roll, cookie, cracker, tortilla, fried or baked snack food, expanded dough or cereal and cake products.

44. The confectionery of claim 43 wherein said farinaceous composition comprises flour, sugar and fat or shortening.

45. The confectionery of claim 42 wherein said fat is a triglyceride vegetable fat.

46. The confectionery of claim 42 wherein said fat based coating composition contains 30% to 50% of at least one hard butter selected from the group consisting of palm, palm kernel, rapeseed, cocoa butter, soy bean, corn, illipe, phulwara, coconut, peanut and cotton seed oil.

47. The confectionery of claim 44 wherein said hard butter is fractionated, partially hydrogenated or interesterified.

48. The confectionery of claim 42 wherein said fat based coating composition is chocolate comprising cocoa butter, milk solids, sugar, cocoa powder and lecithin.

49. The confectionery of claim 42 wherein said dicarboxylic acid is an alkyl dicarboxylic acid having from 4 to 14 carbon atoms.

50. The confectionery of claim 42 wherein said dicarboxylic acid is malonic, adipic, pimelic, sebacic, 3-hexendioic, decandioic, dodecandioic, 4-aza-5-keto-1,10-decanedioic acid, 5-oxo-1,9-nonanedioic acid, 4-keto-1,7-heptanedioic acid, 4-octene-1,8-dioic acid or p-pentanoic benzoic acid.

51. The confectionery of claim 42 wherein said dicarboxylic acid has a particle size distribution of about 10 to 200 microns.

52. The confectionery of claim 51 wherein said dicarboxylic has a particle size of about 20 microns.

53. The confectionery of claim 42 wherein said dicarboxylic acid is present in an amount of about 0.1 to 5.0% by weight of fat in said composition.

54. The confectionery of claim 53 wherein said dicarboxylic acid is present in an amount of about 0.25% by weight.

55. The confectionery of claim 53 wherein said dicarboxylic acid is present in an amount of about 5.0% by weight.

56. The confectionery of claim 42 wherein the edible base is a confectionery candy base or an edible nut base.

57. The confectionery of claim 42 wherein the edible base is a fruit base.

58. The confectionery of claim 57 wherein the fruit base is selected from the group consisting of raisins, dried apples, dried apricots and dried bananas.

59. The confectionery of claim 57 wherein the fruit base is a fig paste, strawberry paste, blueberry paste, apple paste, banana paste, apricot paste or raisin paste.

* * * * *